US012512189B1

(12) United States Patent
Horowitz et al.

(10) Patent No.: US 12,512,189 B1
(45) Date of Patent: Dec. 30, 2025

(54) SYSTEM, APPARATUS, AND METHOD FOR AIDING IN RECRUITMENT, RETENTION, AND COMPLIANCE IN MEDICAL CLINICAL TRIALS

(71) Applicant: SPROUTEL, INC., Providence, RI (US)

(72) Inventors: Aaron J. Horowitz, Providence, RI (US); Joel B. Schwartz, Baltimore, MD (US); Brian Oley, Richmond, VT (US); Nicholas G. Mead, East Providence, RI (US); Sam Martinez, Houston, TX (US)

(73) Assignee: Sproutel, Inc., Providence, RI (US)

( * ) Notice: Subject to any disclaimer, the term of this patent is extended or adjusted under 35 U.S.C. 154(b) by 273 days.

(21) Appl. No.: 18/206,967

(22) Filed: Jun. 7, 2023

(51) Int. Cl.
*G16H 10/20* (2018.01)
*A63F 13/2145* (2014.01)
(Continued)

(52) U.S. Cl.
CPC ......... *G16H 10/20* (2018.01); *A63F 13/2145* (2014.09); *A63F 13/655* (2014.09);
(Continued)

(58) Field of Classification Search
None
See application file for complete search history.

(56) References Cited

U.S. PATENT DOCUMENTS

| 5,405,266 A * | 4/1995 | Frank | G09B 23/28 446/337 |
| 7,066,781 B2 * | 6/2006 | Weston | A63H 33/26 446/268 |

(Continued)

OTHER PUBLICATIONS

The New York Times. "A Talking Teddy Bear Practicing in the Pediatric Hospital," Robotica Episode 4. Jun. 3, 2015; https://www.nytimes.com/2015/06/04/echnology/huggable-robot-therapeutic-value-hospitals.html (Year: 2015).*

(Continued)

*Primary Examiner* — Robert A Sorey
(74) *Attorney, Agent, or Firm* — Renaissance IP Law Group, LLP; David A. Crowther

(57) ABSTRACT

A system for aiding in a medical clinical trial involving one or more pediatric patients includes a patient passport, individual achievement stickers that are awarded to pediatric patients and that are placed within the patient passport, and an interactive companion toy having distinctive patterns thereon. A camera of a mobile device scans the individual achievement stickers in the patient passport and/or the distinctive patterns on the interactive companion toy, and an interactive incentivization application logic section of the mobile device unlocks and display reward content to the pediatric patient. The interactive companion toy, the mobile application, and the physical passport can be customized to match particular protocols of the clinical trial. The pediatric patient is thus incentivized to participate and continue the clinical trial. Virtual medical play associated with the clinical trial can be practiced on the interactive companion toy in an augmented reality environment. Parents are assisted through automatic text message reminders, and electronic patient-reported outcomes are collected, transmitted, processed, and summarized for visualization and insights via a cloud-based clinical trial portal.

19 Claims, 21 Drawing Sheets

(51) Int. Cl.
  *A63F 13/655* (2014.01)
  *A63F 13/69* (2014.01)
  *G06F 3/01* (2006.01)
  *G06F 3/04815* (2022.01)
  *G06F 3/0488* (2022.01)
  *G06T 19/00* (2011.01)
  *G06V 10/94* (2022.01)
  *G06V 20/20* (2022.01)
  *G06V 20/50* (2022.01)

(52) U.S. Cl.
  CPC .............. *A63F 13/69* (2014.09); *G06F 3/011* (2013.01); *G06F 3/04815* (2013.01); *G06F 3/0488* (2013.01); *G06T 19/006* (2013.01); *G06V 10/945* (2022.01); *G06V 20/20* (2022.01); *G06V 20/50* (2022.01); *G06T 2200/24* (2013.01); *G06T 2210/41* (2013.01)

(56) References Cited

U.S. PATENT DOCUMENTS

| | | | | |
|---|---|---|---|---|
| 10,176,725 | B2* | 1/2019 | Fischer | G09B 19/00 |
| 10,748,450 | B1* | 8/2020 | Oley | G09B 23/30 |
| 10,783,799 | B1* | 9/2020 | Horowitz | H04L 67/125 |
| 11,056,022 | B1* | 7/2021 | Horowitz | A63H 3/02 |
| 11,062,377 | B1* | 7/2021 | Piroska | G06Q 30/0631 |
| 2004/0189476 | A1* | 9/2004 | Borovoy | G08B 1/08 340/573.1 |
| 2004/0197764 | A1* | 10/2004 | Stump | G09B 23/28 434/433 |
| 2008/0318192 | A1* | 12/2008 | Jones | G09B 19/00 434/247 |
| 2012/0208641 | A1* | 8/2012 | Bogan | G06Q 30/0207 463/42 |
| 2012/0280988 | A1* | 11/2012 | Lampotang | G09B 23/285 434/262 |
| 2013/0131846 | A1* | 5/2013 | Bulaj | A63F 13/212 700/91 |
| 2013/0224706 | A1* | 8/2013 | Bogan | G06Q 30/0207 434/238 |
| 2019/0189258 | A1* | 6/2019 | Barrett | G16H 40/20 |

OTHER PUBLICATIONS

Staedter, Tracy. "Smart Teddy Bear Knows How You Feel," Discover News. Aug. 15, 2006. (Year: 2006).* https://www.jumohealth.com/solutions/, accessed Sep. 19, 2023.

* cited by examiner and compliance in medical clinical trials in accordance with some embodiments of the inventive concept.
SYSTEM, APPARATUS, AND METHOD FOR AIDING IN RECRUITMENT, RETENTION, AND COMPLIANCE IN MEDICAL CLINICAL TRIALS

TECHNICAL FIELD

This application pertains to medical clinical trials, and more particularly, to a system, apparatus, and method for aiding in the recruitment, retention, and compliance in medical clinical trials.

BACKGROUND

Medical clinical trials are essential to discovering new therapies and cures for diseases. Clinical trials are often lengthy, lasting anywhere from one week to over five years. Over this time, it is important that families attend in-person site visits for data collection. These site visits are often scary for most people, but particularly scary for children, which may include blood draws, spinal taps, muscle biopsies, or the like. Failure to attend site visits results in incomplete data capture and hurts the chances of drug clearance by the U.S. Food and Drug Administration (FDA).

On a regular basis, clinical trials often involve families who are asked to complete surveys about how the treatment is working. Failure to complete these surveys results in improper data collection and damages the chances of FDA approval. There are inherent risks to clinical trials and many people, particularly children, may face unknown and unwanted side effects. As a result of these factors, it is incredibly difficult to recruit families to join a study and help them understand exactly what they are signing up for. Retaining families in the clinical trial from start to completion is also a great challenge. Many families drop out because the responsibility and difficulty associated with the process are simply too large.

During a clinical trial, it is also difficult using conventional techniques to collect robust data both through on-time site visits and on-time completion of at-home surveys. Many families miss site visits and do not complete all necessary at-home surveys. In addition, it is a challenge to provide a positive experience for families in a typical clinical trial setting. Many children develop a fear of visiting sites because of the painful procedures they must endure to ensure appropriate data is collected on the efficacy of the new therapeutic being trialed.

Accordingly, a need remains for improved methods and systems for aiding in the recruitment, retention, and compliance in medical clinical trials. Embodiments of the inventive concept address these and other limitations in the prior art.

Figure 1:
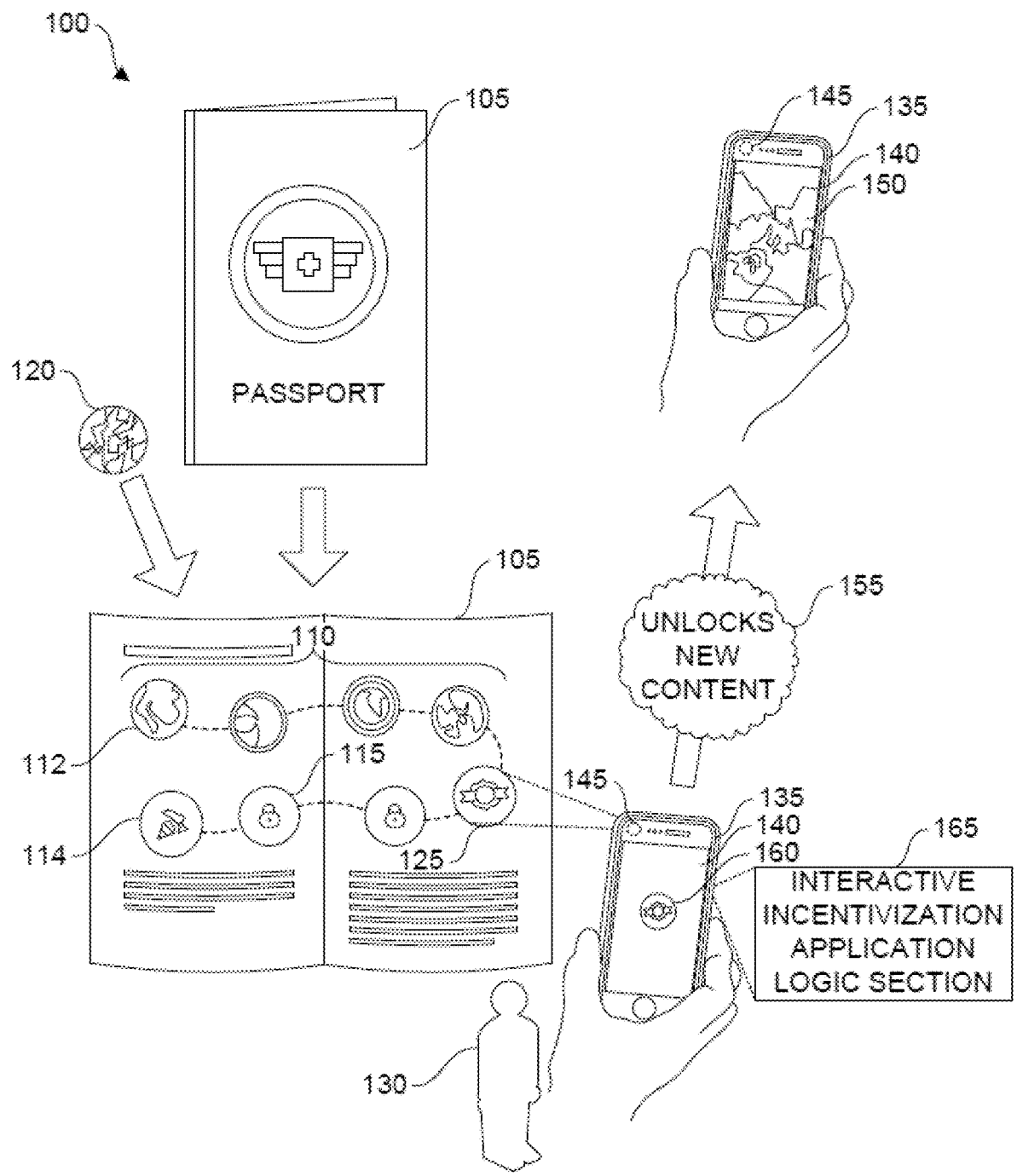
FIG. 1 illustrates a system for aiding in the recruitment, retention, and compliance in medical clinical trials in accordance with some embodiments of the inventive concept.

The foregoing and other features of the inventive concept will become more readily apparent from the following detailed description, which proceeds with reference to the accompanying drawings.

DETAILED DESCRIPTION OF THE EMBODIMENTS

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first patch could be termed a second patch, and, similarly, a second patch could be termed a first patch, without departing from the scope of the inventive concept.

It will be understood that when an element or layer is referred to as being "on," "coupled to," or "connected to" another element or layer, it can be directly on, directly coupled to, or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the present inventive concept provide a platform that can configure an interactive companion, mobile application, and/or physical passport to match a particular protocol for a particular clinical study. Different clinical trials have different protocols. For example, each clinical trial has a unique protocol, outlining a specific set of medical procedures and/or cadence of site visits involved to validate the efficacy of a given drug. As disclosed herein, the interactive companion, the mobile application, and/or the physical passport can be customized to match a particular protocol of a particular clinical trial. For example, the pediatric patient can administer virtual medical care associated with a virtual clinical trial of the interactive companion toy, such that the virtual clinical trial of the interactive companion toy substantially matches the actual clinical trial involving the pediatric patient. Accordingly, a pediatric patient can be supported with a specific instance and/or combination of these elements in such a way as to match the actual experiences that the pediatric patient may endure throughout the clinical trial.

Embodiments disclosed herein include a method for incentivizing retention in the clinical study, and using unlockable digital content to motivate pediatric patients to participate more fully in the clinical study. The platform can incentivize retention and compliance in the clinical study by providing comfort through the interactive companion. Embodiments disclosed herein further include a method for data collection in the clinical trial through questions administered in a gamified fashion and/or answered through physical accessories associated with the interactive companion.

Embodiments of the present inventive concept provide a platform to aid in recruiting, retaining, and engaging pediatric patients in clinical trials. The interactive companion can be cared for by children throughout the clinical trial, in the same or similar ways in which the pediatric patients themselves are cared for. The platform can provide medical play, which can be therapeutic and alleviate anxiety associated with scary and invasive medical procedures throughout the clinical trial for the pediatric patient. The platform provides the ability to scan patches on the interactive companion, which can be scanned to unlock virtual reward content. The pediatric patients and their parents can be incentivized to remain in the study, and complete periodic surveys, with rewards provided in the form of reward content that is unlocked in the interactive companion and/or within an accompanying interactive incentivization application of a mobile device upon completion of site visits and/or digital surveys. Further, the platform can provide pharmaceutical companies and/or researchers associated with the clinical trial a clinical trial cloud-based portal to visualize all of the data collected from the use of one or more interactive companions.

In addition, a patient passport can be provided to the pediatric patient, with predefined locations to place one or more stickers within the patient passport. The one or more stickers can be given to the pediatric patient at different times as a reward for certain behaviors and/or completion of tasks. The pediatric patient can place the one or more stickers within the pediatric passport, and scan the one or more stickers using a mobile device. The scanning of the one or more stickers can cause reward content to be unlocked within the interactive incentivization application of the mobile device, such as a storybook, a game, a character, a virtual world, an activity, or the like.

The interactive incentivization application of the mobile device can collect patient reported outcomes, survey data, and the like, the completion of which can unlock additional rewards for the pediatric patient. The patient reported outcomes and/or survey data can be aggregated and stored by a remote server, and made available to pharmaceutical companies, clinical trial sponsors, researchers, and/or managers of the clinical trial, or the like. Accordingly, all stakeholders in the clinical trial can gain access to aggregated data, trends, completion percentages, medical procedure correctness, and/or frequency of medical administered to interactive companions, or the like. Parents of the pediatric patient can opt in to receive text messages that facilitate appropriate use of the interactive companion and/or the interactive companion application.

FIG. 1 illustrates a system 100 for aiding in the recruitment, retention, and compliance in medical clinical trials in accordance with some embodiments of the inventive concept. The system 100 can include a physical patient passport 105. The patient passport 105 can be a booklet, for example, made of paper, cardboard, plastic, or the like. The patient passport 105 can be opened to reveal an incentivized clinical trial roadmap 110 for a pediatric patient 130 participating in a clinical trial. The incentivized clinical trial roadmap 110 can include individual achievement sticker placeholders (e.g., 115) printed on and/or within the patient passport 105. The individual achievement sticker placeholders 115 can be placeholders for one or more individual achievement stickers (e.g., 120, 125), which can be awarded to the pediatric patient 130 upon completing a given task, visiting a site, and/or as an incentive to continue participation in the clinical trial. The physical passport 105 can be used to help the pediatric patient 130 track their progress through the clinical trial. In some embodiments, each time the pediatric patient 130 visits a physical site, the pediatric patient 130 can receive an individual achievement sticker (e.g., 120) for their patient passport 105, which can unlock additional creative content in an interactive incentivization application logic section 165 of the mobile device 135. The physical patient passport 105 can be customized to match one or more protocols of a particular clinical trial. For example, the individual achievement sticker placeholders 115 can be customized to correspond with one or more specific protocols of the particular clinical trial. Accordingly, retention in the clinical trial can be improved because the pediatric patient 130 is incentivized to remain in the clinical trial.

The one or more individual achievement stickers (e.g., 120, 125) can have an adhesive on one side thereof. The incentivized clinical trial roadmap 110 can include a first individual achievement sticker placeholder 112 through to a last individual achievement sticker placeholder 114, providing a roadmap for the pediatric patient 130 to complete and/or fill in with one or more individual achievement stickers (e.g., 120, 125). The one or more individual achievement stickers (e.g., 120, 125) can be awarded to the pediatric patient 130 for performing certain tasks, which can be as easy as showing up for an appointment. Other tasks can include taking a medication, receiving a shot, undergoing an exam, filling in a survey, or the like.

The pediatric patient 130 may hold a mobile device (e.g., 135) such as a smart phone or tablet having touch-sensitive display screen 140 and a camera 145. The individual achievement stickers (e.g., 120, 125) can each have a uniquely identifiable pattern printed on it so that it can be scanned and recognized by the mobile device 135. A particular individual achievement sticker (e.g., 125) that was previously placed on the clinical trial roadmap 110 of the patient passport 105 can be scanned by the camera 145 of the mobile device 135. An image 160 of the scanned sticker 125 can appear on the touch-sensitive display screen 140. In response to scanning the particular individual achievement sticker 125, the interactive incentivization application logic section 165 can cause reward content 150 to be unlocked at 155 within an interactive companion application, and displayed on the touch-sensitive display screen 140 of the mobile device 135, such as a storybook, a game, a character, a virtual world, an activity, or the like, as further described below. In some embodiments, the pediatric patient 130 can build their at-home and/or on-site protocols by placing the individual achievement stickers (e.g., 120, 125) representing various medical procedures the pediatric patient 130 may experience in a sequential order, corresponding to the on-site protocols and/or at-home protocols. In some embodiments, at each site visit the pediatric patient 130 may receive individual achievement stickers (e.g., 120, 125) for their patient passport 105 to track their overall progress through the clinical trial study.

Accordingly, the pediatric patient 130 can be incentivized to participate more fully in the clinical trial through the receipt of stickers (e.g., 120, 125), which are placed in the patient passport 105, which can then be scanned by the mobile device 135 to provide new virtual incentives and experiences. Thus, activities associated with a clinical trial such as recruitment, retention, and compliance can be incentivized and enhanced using both physical rewards (e.g., stickers 120, 125) and virtual awards (e.g., unlocked virtual content 150) linked to the physical rewards. The unlocking of the virtual content 150 can occur in an augmented reality environment. In other words, the individual achievement stickers (e.g., 120, 125) can serve as augmented reality markers, and can unlock an augmented reality environment on the mobile device 130.

Figure 2:
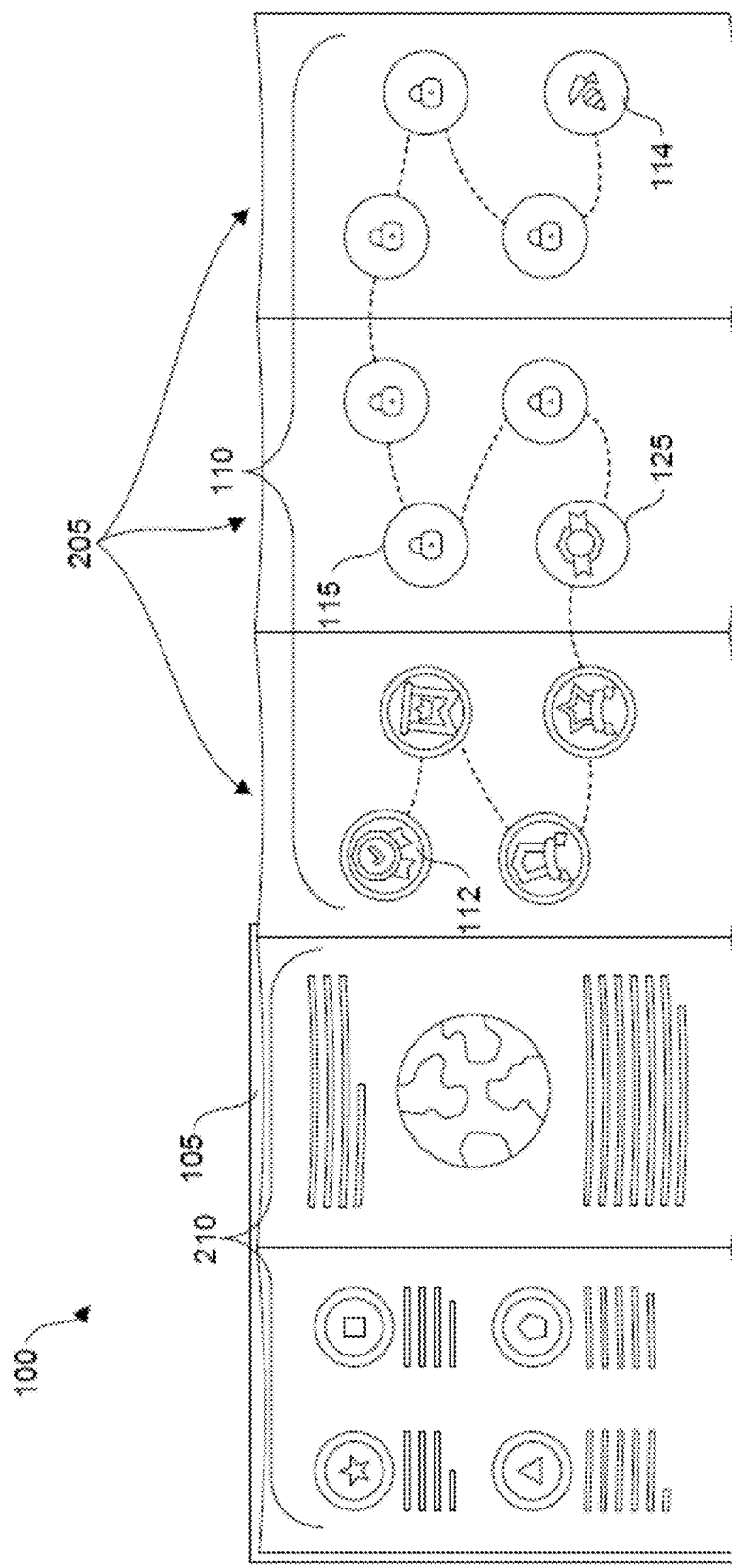
FIG. 2 illustrates one example aspect of the system of FIG. 1 in accordance with some embodiments of the inventive concept.

FIG. 2 illustrates one example aspect of the system 100 of FIG. 1 in accordance with some embodiments of the inventive concept. The patient passport 105 can included a folded extension 205. The folded extension 205 can be folded together and stored inside of the patient passport 105, and/or unfolded and extended to reveal the incentivized clinical trial roadmap 110. The folded extension 205 can be permanently bound to the patient passport 105. The folded extension 205 can include the individual achievement sticker placeholders (e.g., 112, 114, 115) and/or the one or more individual achievement stickers (e.g., 120, 125) adhered thereto. The patient passport 105 can include additional information 210 such as the name of the pediatric patient 130, a picture of the pediatric patient 130, a physical address of the hospital or healthcare facility where the clinical trial is taking place, additional individual achievement sticker placeholders, additional individual achievement stickers, or the like. The physical patient passport 105 can be customized to match one or more protocols of a particular clinical trial. For example, the folded extension 205 can include information that correspond with one or more specific protocols of the particular clinical trial.

Figure 3:
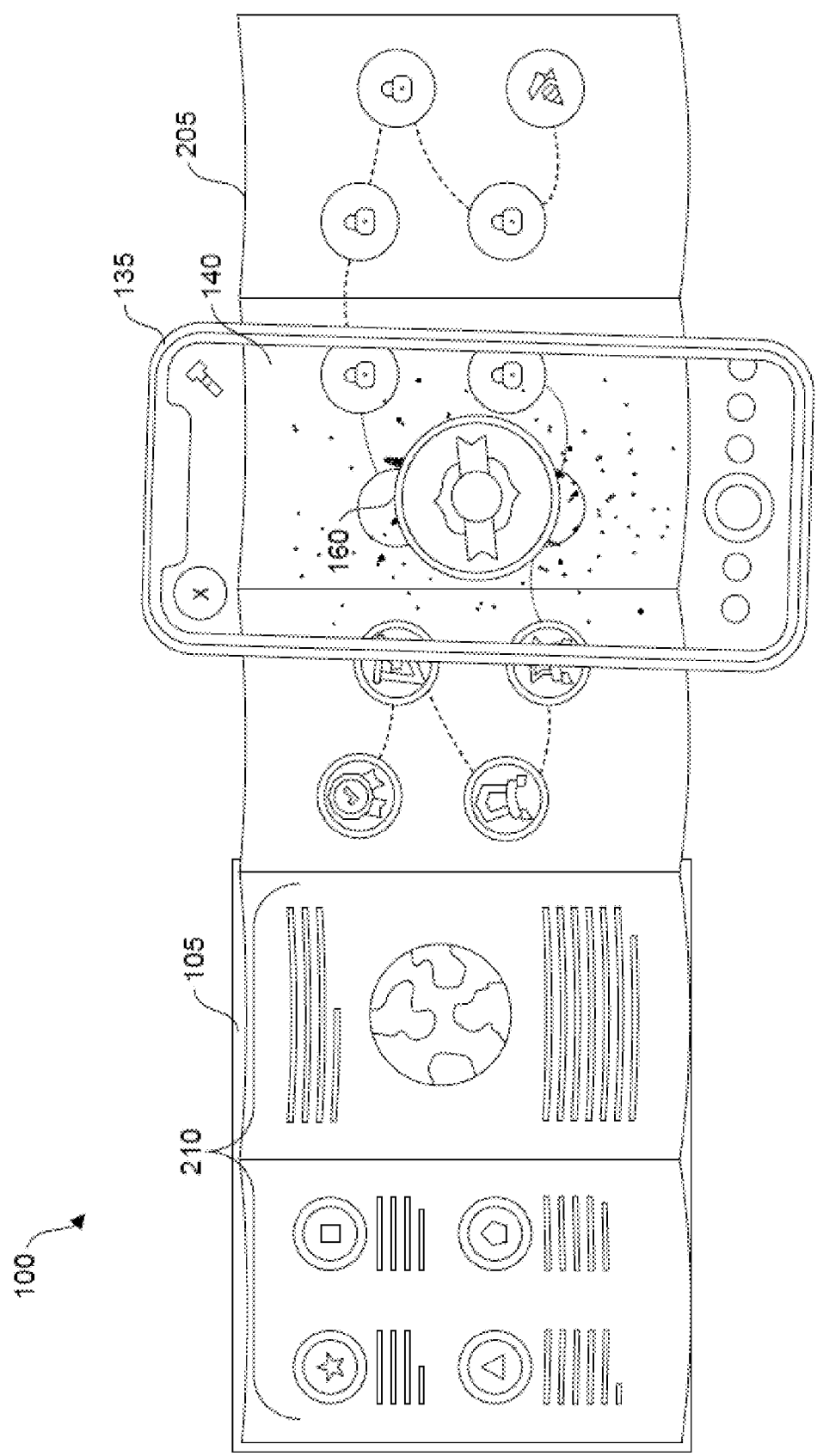
FIG. 3 illustrates another example aspect of the system of FIG. 1 in accordance with some embodiments of the inventive concept.

FIG. 3 illustrates another example aspect of the system 100 of FIG. 1 in accordance with some embodiments of the inventive concept. The image 160 of the scanned sticker (e.g., 125 of FIG. 1) is shown on the touch-sensitive display 140 of the smart mobile device 135. The pediatric patient (e.g., 130 of FIG. 1) can scan individual achievement stickers that are placed on the folded extension 205 of the patient passport 105.

Figure 4:
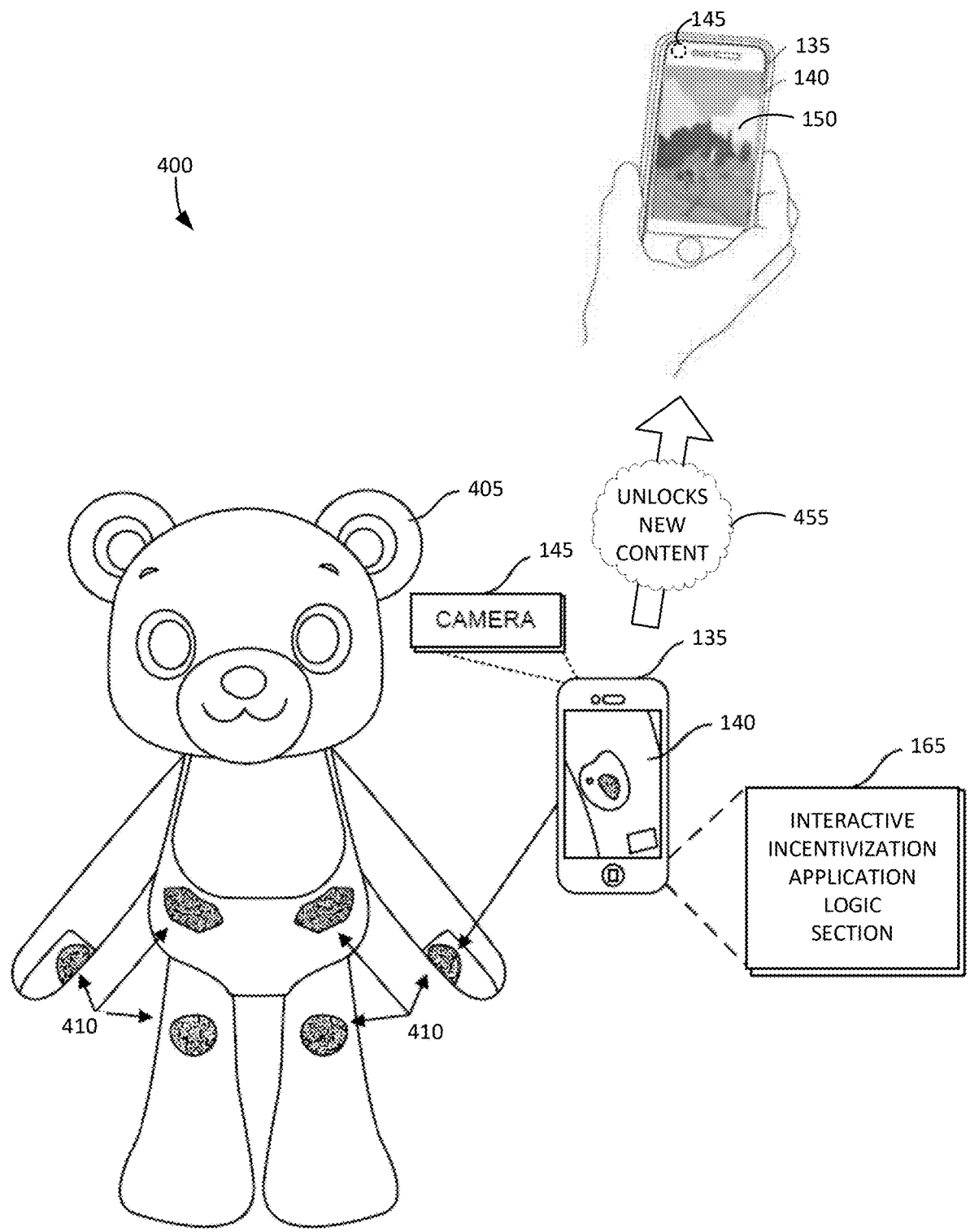
FIG. 4 illustrates another system for aiding in the recruitment, retention, and compliance in medical clinical trials in accordance with some embodiments of the inventive concept.

FIG. 4 illustrates another system 400 for aiding in the recruitment, retention, and compliance in medical clinical trials in accordance with some embodiments of the inventive concept. The system 400 can include an interactive companion toy 405. In some embodiments, the interactive companion toy is a smart toy and/or plush toy. The interactive companion toy 405 can be, for example, a plush animal, a plush character, or other suitable object that is inviting to children. The interactive companion toy 405 can include one or more uniquely identifiable patches 410 as disposed at various locations on the interactive companion toy 405. The one or more uniquely identifiable patches 410 can include a pattern disposed on a surface or body of the interactive companion toy 405, and need not be separate or different material from the interactive companion toy 405. The uniquely identifiable patches 410 can be placed on the plush toy 405 corresponding to key areas where the child will interact with the interactive companion toy 405 to provide medical care associated with the clinical trial, and/or to otherwise interact with the interactive companion toy 405 in an augmented reality environment. Alternatively or in addition, in response to scanning one of the uniquely identifiable patches 410, the interactive incentivization application logic section 165 can cause reward content 150 to be unlocked at 455 within the interactive companion application, and displayed on the touch-sensitive display screen 140 of the mobile device 135, such as a storybook, a game, a character, a virtual world, an activity, or the like, as further described below.

The uniquely identifiable patches 410 can be made of cloth material, plastic, metal, or any other suitable material. In some embodiments, one or more of the uniquely identifiable patches 410 is an adhesive sticker, which can be moved from one location of the interactive companion toy 405 to another location of the interactive companion toy 405 by the pediatric patient 130. The adhesive sticker and/or patches 410 can have a uniquely identifiable pattern printed on it so that it can be scanned and recognized by the mobile device 135.

The system 400 can include the mobile device 135 such as a smart phone or tablet. The mobile device 135 can include one or more sensors and/or cameras (e.g., 145) configured to scan one or more of the uniquely identifiable patches 410 using a built-in visible light camera 145 of the mobile device 135. The mobile device 135 can include an interactive incentivization application logic section 165 that is configured to produce an augmented reality experience to simulate medical procedures associated with the clinical trial, as further described below, and/or to provide a fun virtual reality or augmented reality reward or experience to the pediatric patient 130, as also described below.

The interactive incentivization application logic section 165 enables pediatric patients to scan the uniquely identifiable patches 410 on the interactive companion toy 405 with a camera of their mobile device 135. Upon recognition of a particular uniquely identifiable patch 410, an animation can begin and can be displayed on the touch-sensitive display screen 140 of the mobile device 135. The animation can be specific and/or customized to one or more protocols of the clinical trial. The pediatric patient 130 can be notified that the scanned uniquely identifiable patch 410 has been identified. The interactive incentivization application logic section 165 can then display disease care tools in an augmented reality fashion associated with the clinical trial. The disease care tools can be specific and/or customized to one or more protocols of a particular clinical trial. Alternatively or in addition, in response to scanning one of the uniquely identifiable patches 410, the interactive incentivization application logic section 165 can cause reward content 150 to be unlocked at 455 within the interactive companion application, and displayed on the touch-sensitive display screen 140 of the mobile device 135, such as a storybook, a game, a character, a virtual world, an activity, or the like, as further described below. The reward content 150 can be customized and/or specific to one or more protocols of the particular clinical trial.

The pediatric patient 130 can interact with the disease care tools and provide medical care to the interactive companion toy 405 through augmented reality as if they were using real medical devices on a human with the same illness. The interactive incentivization application logic section 165 can include a simulation of the disease associated with the clinical trial and thus provides appropriate feedback to the pediatric patient 130 as they are administering medical procedures. The interactive incentivization application logic section 165 can further provide feedback to the pediatric patient 130 after the virtual medical procedure has been completed based on how effective the procedure was at treating and managing the disease simulation.

In some embodiments, the one or more of the uniquely identifiable patches 410 can be in the form of an adhesive sticker, which simulates a virtual insulin pump site via the display screen 140 of the mobile device 135. Pediatric patients (e.g., 130) can move the sticker around the interactive companion toy 405, much like they need to move around their own infusion site. When the uniquely identifiable patch and/or sticker is recognized by the mobile device 135, a digital virtual infusion site can appear on the display screen 140 of the mobile device 135. This feature adds an additional layer to how physical play with the interactive companion toy 405 translates into an augmented virtual reality world for the pediatric patient 130.

More specifically, the system 400 can include an interactive companion toy 405 having one or more patches 410 disposed on a body of the interactive companion toy 405 in one or more corresponding locations each associated with an area of the body of the plush toy 405 that is comparable to an area of the human body. The system 400 can include an interactive incentivization application logic section 165, as shown in FIG. 4, which is operable within the mobile device 135. The mobile device 135 can include the visible light camera 145, which can capture a series of live images of the interactive companion toy 405 having the one or more patches 410. The mobile device 135 can display the series of live images on the touch-sensitive display screen 140 of the mobile device 135.

The interactive incentivization application logic section 165 can cause a particular patch from among the one or more patches 410 within the series of live images to be scanned, and can initiate an interactive augmented reality experience to simulate a medical procedure associated with the clinical trial responsive to the scanned particular patch, and/or can cause reward content 150 to be unlocked at 455 within the interactive companion application, and displayed on the touch-sensitive display screen 140 of the mobile device 135, such as a storybook, a game, a character, a virtual world, an activity, or the like, as further described below.

The pediatric patient 130 can be enabled to provide medical care to the interactive companion toy 405 in an augmented reality environment. The interactive incentivization application logic section 165 of the mobile device 135 can be customized to match one or more specific clinical trial protocols to the augmented reality environment. For example, the interactive incentivization application logic section 165 of the mobile device 135 can be customized to match a number of site visits, one or more site protocols, and/or one or more at-home protocols associated with the clinical trial. The pediatric patient 130 can administer virtual medical care to the interactive companion toy 405 in a virtual clinical trial that substantially matches and/or mimics the actual real-life clinical trial involving the pediatric patient 130.

Figure 5:
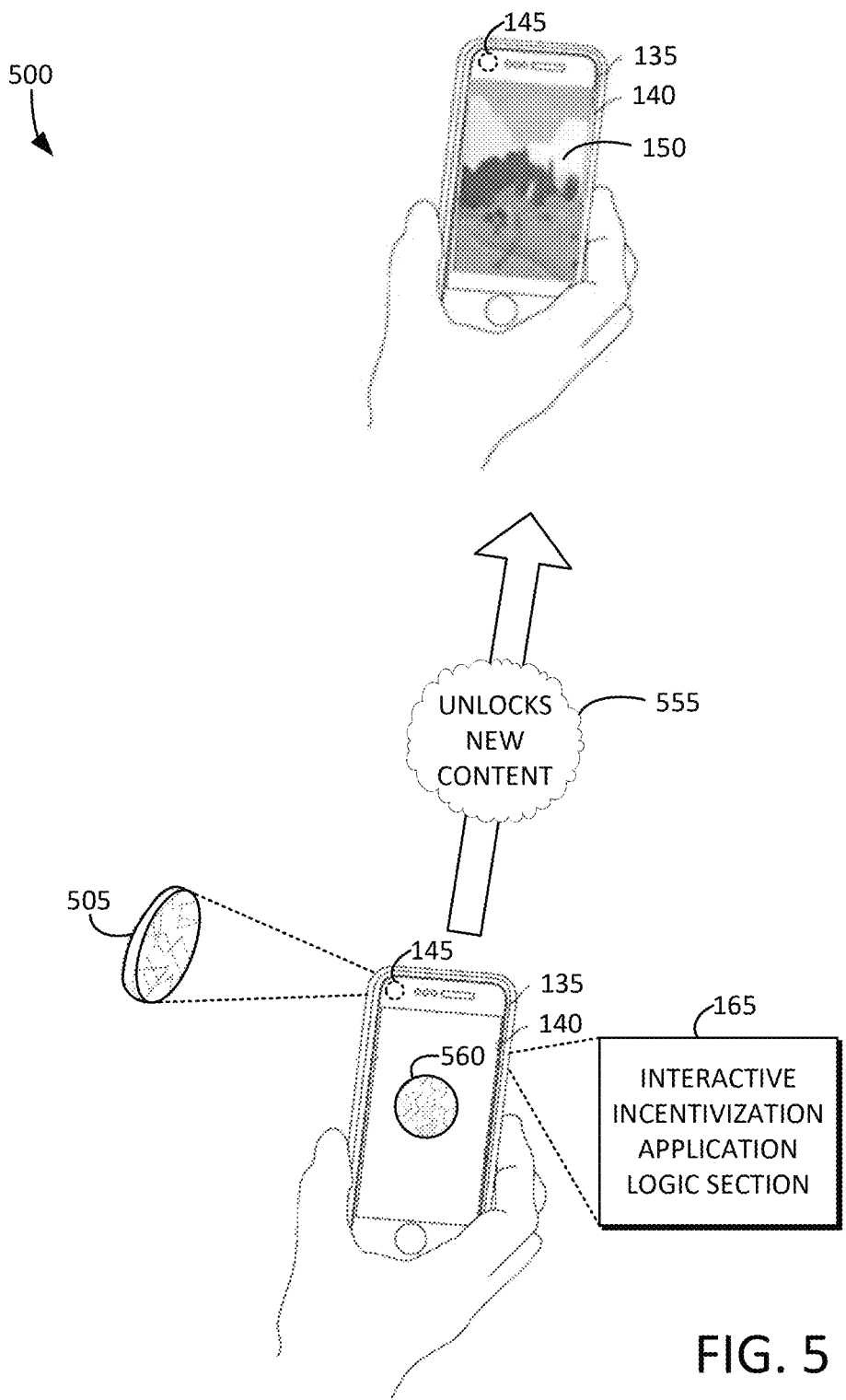
FIG. 5 illustrates yet another system for aiding in the recruitment, retention, and compliance in medical clinical trials in accordance with some embodiments of the inventive concept.

FIG. 5 illustrates yet another system 500 for aiding in the recruitment, retention, and compliance in medical clinical trials in accordance with some embodiments of the inventive concept. Some of the reference numerals of FIG. 5 are described above, and therefore, a detailed description is not necessarily repeated. Of particular note in FIG. 5, rather than scanning a sticker or a patch, the pediatric patient 130 can scan one or more individual achievement physical three-dimensional tokens (e.g., 505), and an image 560 of the one or more individual achievement physical three-dimensional tokens can be displayed on the touch-sensitive display screen 140 of the mobile device 135. The individual achievement physical three-dimensional tokens (e.g., 505) can be a coin, an artifact, a sculpture, or the like. The individual achievement physical three-dimensional tokens (e.g., 505) can be made of metal, plastic, wood, or the like. The individual achievement physical three-dimensional tokens (e.g., 505) can be specific and/or customized to one or more protocols of the particular clinical trial. One or more individual achievement physical three-dimensional tokens (e.g., 505) can be awarded to the pediatric patient 130 during the course of the clinical trial, as incentive to complete certain tasks and to continue with the clinical trial.

In response to scanning the individual achievement physical three-dimensional token 505 with the mobile device 135, the interactive incentivization application logic section 165 can cause the reward content 150 to be unlocked at 555 within the interactive companion application, and displayed on the touch-sensitive display screen 140 of the mobile device 135, such as a storybook, a game, a character, a virtual world, an activity, or the like, as further described below.

Figure 6:
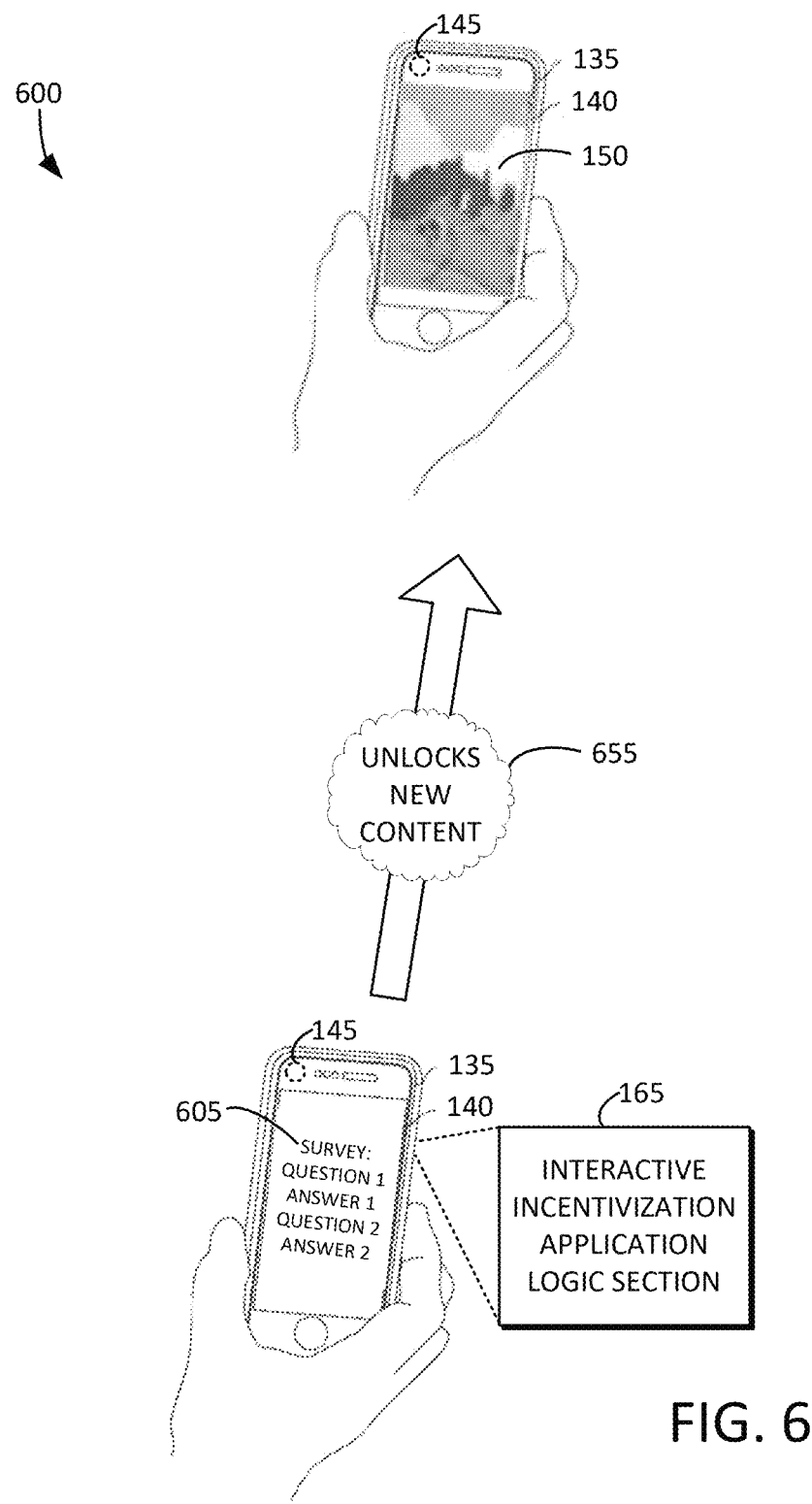
FIG. 6 illustrates still another system for aiding in the recruitment, retention, and compliance in medical clinical trials in accordance with some embodiments of the inventive concept.

FIG. 6 illustrates still another system 600 for aiding in the recruitment, retention, and compliance in medical clinical trials in accordance with some embodiments of the inventive concept. Some of the reference numerals of FIG. 6 are described above, and therefore, a detailed description is not necessarily repeated. Of particular note in FIG. 6, rather than scanning a sticker or a patch, the pediatric patient and/or the pediatric patient's parents can complete one or more survey questions 605 related to the clinical trial. One or more surveys can be administered via the mobile device 135 during the course of the clinical trial, and specific and/or customized to one or more protocols of the particular clinical trial. The one or more survey questions 605 can be directed to the pediatric patient 130 and/or to parents of the pediatric patient 130. The one or more survey questions 605 can be requested while onsite at a healthcare facility and/or while the pediatric patient 130 is at home. Each time the pediatric patient 130 and/or a parent of the pediatric patient 130 completes the one or more survey questions 605, or otherwise provides patient-reported outcomes, additional reward content 150 can be unlocked, thereby driving usage.

In response to completing the one or more survey questions 605 using the mobile device 135, the interactive incentivization application logic section 165 can cause the reward content 150 to be unlocked at 655 within the interactive companion application, and displayed on the touch-sensitive display screen 140 of the mobile device 135, such as a storybook, a game, a character, a virtual world, an activity, or the like, as further described below.

Figure 7:
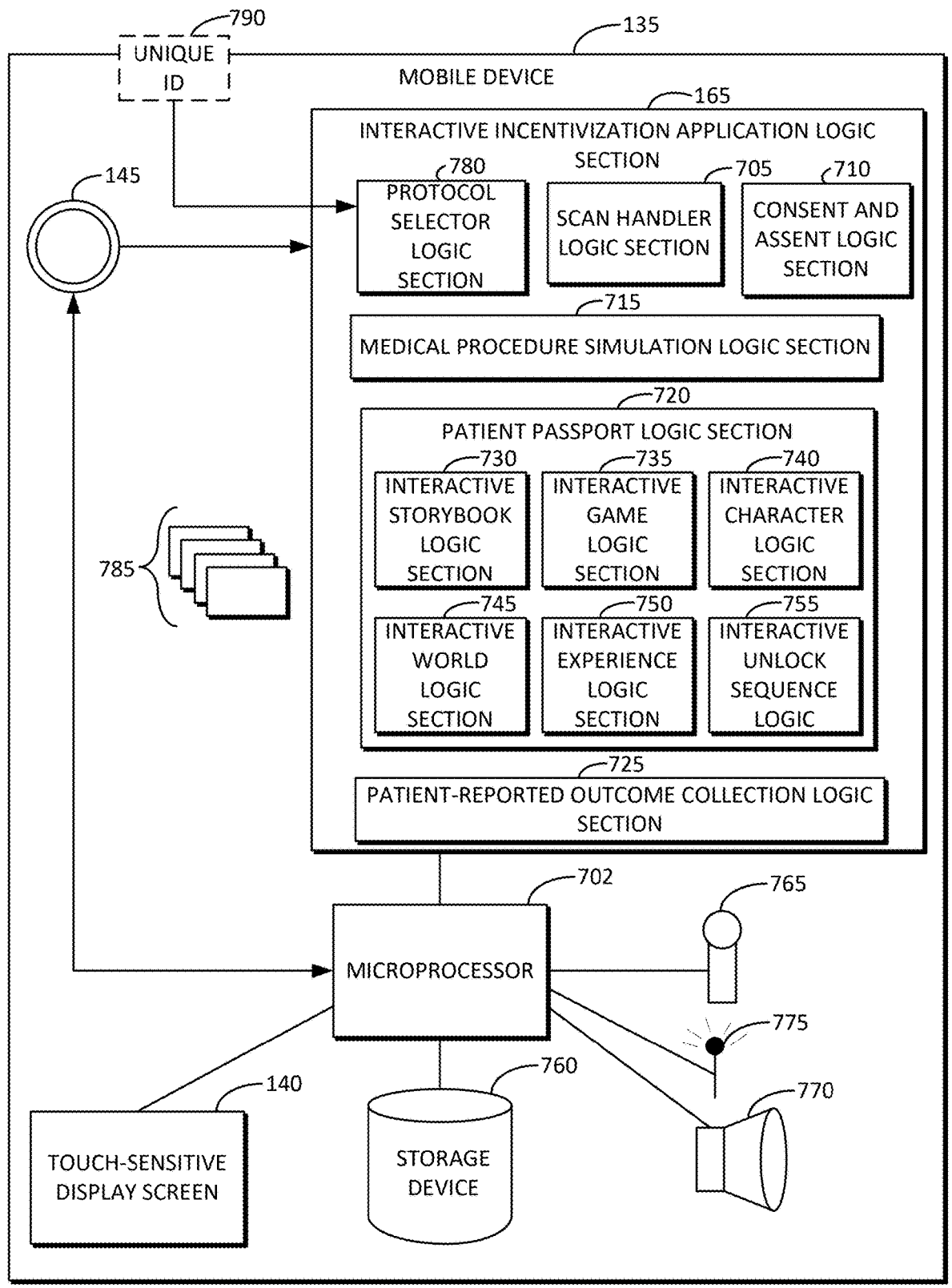
FIG. 7 illustrates a block diagram of a mobile device for aiding in the recruitment, retention, and compliance in medical clinical trials in accordance with some embodiments of the inventive concept.

FIG. 7 illustrates a block diagram of a mobile device 135 for aiding in the recruitment, retention, and compliance in medical clinical trials in accordance with some embodiments of the inventive concept. The mobile device 135 can include the interactive incentivization application logic section 165, which can be operable within the mobile device 135. The mobile device 135 can include the visible light camera 145, which can capture a series of live images 785. The series of live images 785 can be of the interactive companion toy 405 having the one or more patches 410. Alternatively or in addition, the series of live images 785 can be of the one or more individual achievement stickers (e.g., 120, 125). Alternatively or in addition, the series of live images 785 can be of the one or more individual achievement physical three-dimensional tokens (e.g., 505). The mobile device 135 can display the series of live images 785 on the touch-sensitive display screen 140 of the mobile device 135.

As illustrated in FIG. 7, the interactive incentivization application logic section 165 can include a scan handler logic section 705, a consent and assent logic section 710, a medical procedure simulation logic section 715, a patient passport logic section 720, and a patient-reported outcome collection logic section 725. The patient passport logic section 720 can include an interactive storybook logic section 730, an interactive game logic section 735, an interactive character logic section 740, an interactive world logic section 745, an interactive experience logic section 750, and/or an interactive unlock sequence logic section 755. The interactive storybook logic section 730, for example, can enable a storybook to appear on the touch-sensitive display device 140 of the mobile device 135 as new unlocked reward content 150.

The scan handler logic section 705 of the interactive incentivization application logic section 165 can cause a particular patch from among the one or more patches 410 within the series of live images 785 to be scanned, and can initiate an interactive augmented reality experience to simulate a medical procedure for pediatric disease education responsive to the scanned particular patch. Alternatively or in addition, the interactive incentivization application logic section 165 can cause a particular patch from among the one or more patches 410 within the series of live images 785 to be scanned, and can cause reward content 150 to be unlocked, and displayed on the touch-sensitive display screen 140 of the mobile device 135, such as a storybook, a game, a character, a virtual world, an activity, or the like. Alternatively or in addition, the interactive incentivization application logic section 165 can cause a particular individual achievement sticker (e.g., 125 of FIG. 1) within the series of live images 785 to be scanned, and can cause reward content 150 to be unlocked, and displayed on the touch-sensitive display screen 140 of the mobile device 135, such as the storybook, the game, the character, the virtual world, the activity, or the like. Alternatively or in addition, the interactive incentivization application logic section 165 can cause a particular individual achievement physical three-dimensional token (e.g., 505 of FIG. 5) within the series of live images 785 to be scanned, and can cause reward content 150 to be unlocked, and displayed on the touch-sensitive display screen 140 of the mobile device 135, such as the storybook, the game, the character, the virtual world, the activity, or the like.

The mobile device 135 can further include a microprocessor 702. The microprocessor 702 can execute logic independently of or in cooperation with the interactive incentivization application logic section 165. The mobile device 135 can further include a storage device 760, which can store data received from the camera 145, the microprocessor 702, the touch-sensitive display screen 140, and/or the interactive incentivization application logic section 165. The storage device 760 can be any suitable non-volatile or volatile memory or storage medium. The mobile device 135 can further include a speaker 770 to emit audible sounds and a microphone 765 to capture audible sounds. The mobile device 135 can further include one or more transceivers (e.g., 775) to send and receive information wirelessly and/or via a cellular network.

The operation of the mobile device 135 can be specific and/or customized to one or more protocols of the particular clinical trial. For example, the pediatric patient 130 can be provided with a unique identifier (ID) 790. The unique ID 790 can be provided to the mobile device 135. For example, the unique ID 790 can be entered via the touch-sensitive display screen 140 and/or transmitted to the mobile device 135 via the one or more transceivers 775. The unique ID 790 can be received by a protocol selector logic section 780 of the interactive incentivization application logic section 165. The protocol selector logic section 780 can select one or more protocols that are specific to a particular clinical trial based on the unique ID 790.

In other words, the interactions with the pediatric patient 130 and associated experiences during the particular clinical trial can be customized to the specific protocols associated with the particular clinical trial. For example, the scan handler logic section 705, the consent and assent logic section 710, the medical procedure simulation logic section 715, the patient passport logic section 720, the patient-reported outcome collection logic section 725, and the like, can be customized and/or purpose-built for multiple clinical trials and multiple associated protocols- and the protocol selector logic section 780 can select among the multiple associated protocols and/or operation of these logic sections to match the particular clinical trial that the pediatric patient 130 will be subjected to based on the unique ID 790 provided to the protocol selector logic section 780. By way of another example, the protocol selector logic section 780 can receive the unique ID, and based on the unique ID, the protocol selector logic section 780 can select one or more protocols matching the clinical trial involving the pediatric patient 130. The selected one or more protocols can indicate which type of virtual medical care is able to be administered to the interactive companion toy 405 corresponding to the clinical trial.

Figure 8:
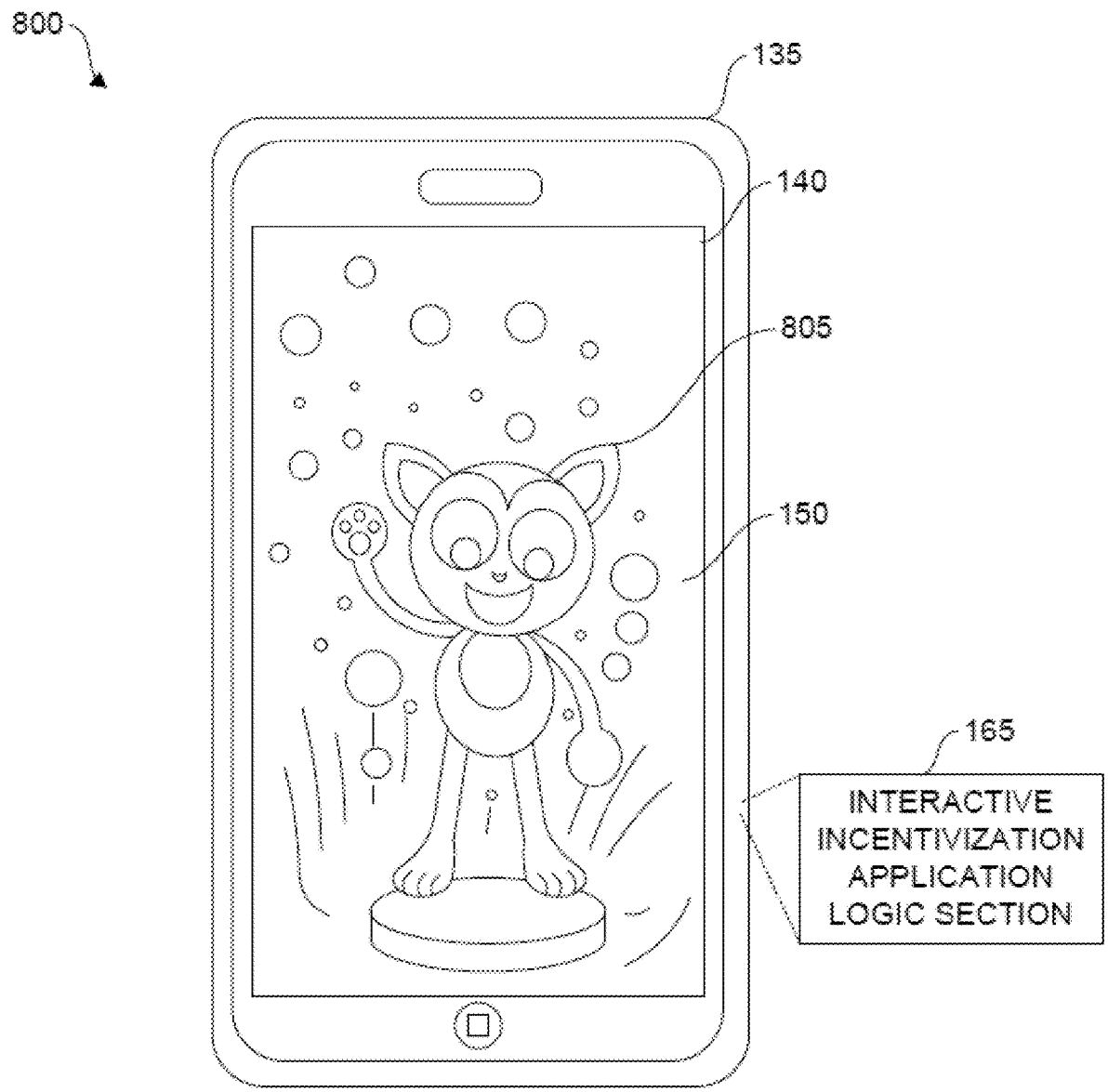
FIG. 8 illustrates an example character reveal of an interactive incentivization application logic section of a mobile device in accordance with some embodiments of the inventive concept.

FIG. 8 illustrates an example character reveal 800 of an interactive incentivization application logic section 165 of a mobile device 135 in accordance with some embodiments of the inventive concept. The character reveal 800 can include a still and/or animated image of a character 805 that is displayed on the touch-sensitive display screen 140 of the mobile device 135. The character 805 can be new reward content 150 that is unlocked for the pediatric patient 130 upon completion of a given task. In some embodiments, the pediatric patient 130 can interact with the character 805 using the touch-sensitive display screen 140. The interactive character logic section 740 (of FIG. 7) of the interactive incentivization application logic section 165 can cause the character 805 to be displayed in response to scanning an individual achievement sticker (e.g., 125 of FIG. 1), a uniquely identifiable patch (e.g., 410 of FIG. 4), and/or an individual achievement physical three-dimensional token (e.g., 505 of FIG. 5). Alternatively or in addition, the interactive character logic section 740 (of FIG. 7) of the interactive incentivization application logic section 165 can cause the character 805 to be displayed in response to the completion of a survey (e.g., 605 of FIG. 6), and/or in response to completing some other task associated with the clinical trial. The interactive incentivization application logic section 165 can receive inputs from the pediatric patient 130 via the touch-sensitive display screen 140, and can cause changes to the appearance of the character 805 in response to those inputs.

Figure 9:
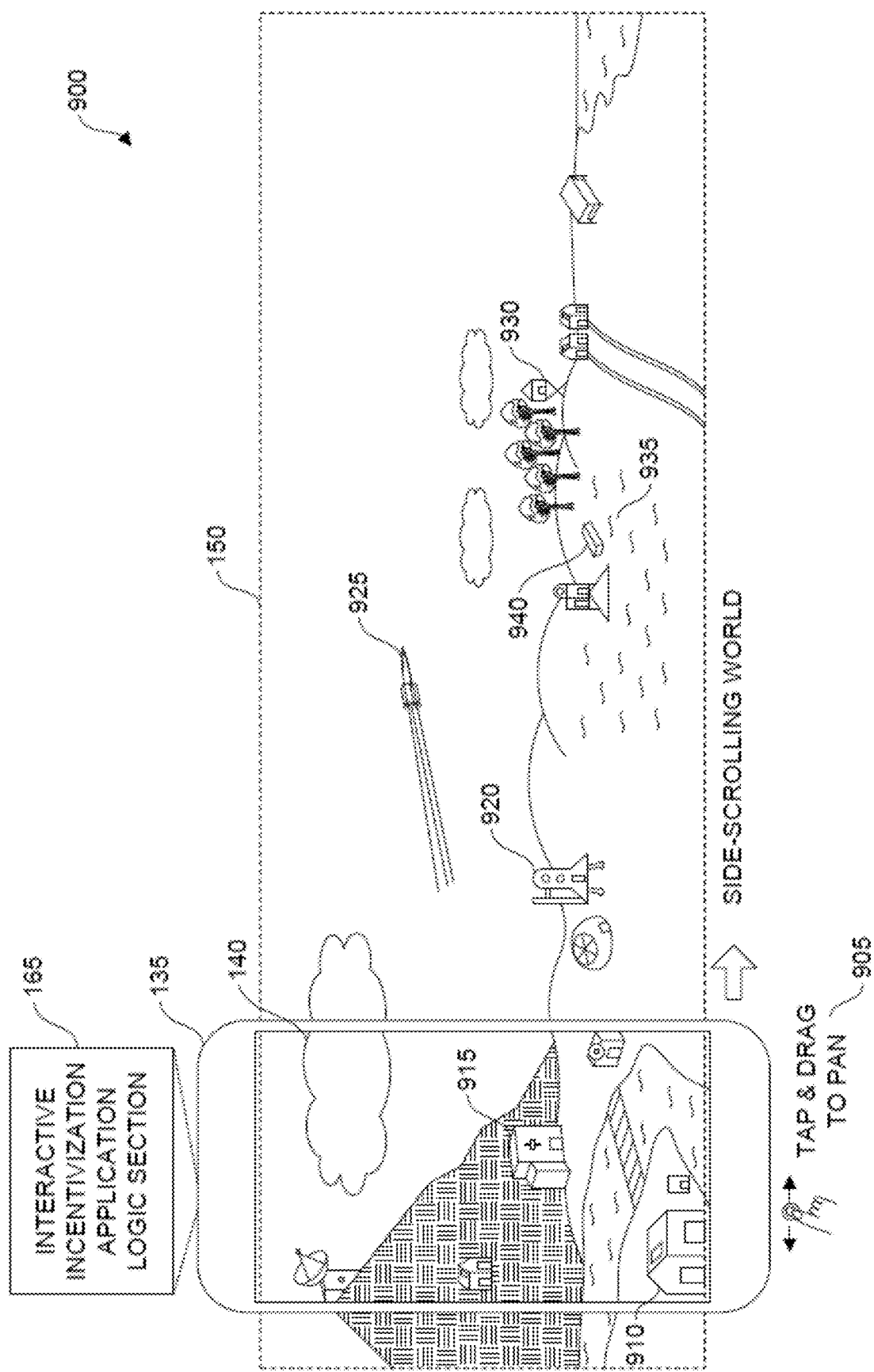
FIG. 9 illustrates an example virtual world of an interactive incentivization application logic section of a mobile device in accordance with some embodiments of the inventive concept.

FIG. 9 illustrates an example virtual world 900 of an interactive incentivization application logic section 165 of a mobile device 135 in accordance with some embodiments of the inventive concept. In some embodiments, the virtual world 900 can be a side-scrolling world. For example, the pediatric patient 130 can tap the touch-sensitive display screen 140 of the mobile device 135, and drag the screen to the left or right to pan the virtual world 900 as shown at 905, thereby revealing different portions of the virtual world 900. In some embodiments, the virtual world 900 can be scrolled vertically or diagonally. Virtual buildings such as a virtual home 910 and a virtual hospital 915 can be included in the virtual world 900. Other virtual items such as virtual rocket ship 920 and/or a virtual plane 925 can be included in the virtual world 900. Other virtual features such as a virtual birdhouse 930, a virtual lake 935, and/or a virtual boat 940 can be included in the virtual world 900.

The virtual world 900 can be displayed on the touch-sensitive display screen 140 of the mobile device 135. The virtual world 900 can be new reward content 150 that is unlocked for the pediatric patient 130 upon completion of a given task. In some embodiments, the pediatric patient 130 can interact with the virtual world 900 using the touch-sensitive display screen 140. The interactive world logic section 745 (of FIG. 7) of the interactive incentivization application logic section 165 can cause the virtual world 900 to be displayed in response to scanning an individual achievement sticker (e.g., 125 of FIG. 1), a uniquely identifiable patch (e.g., 410 of FIG. 4), and/or an individual achievement physical three-dimensional token (e.g., 505 of FIG. 5). Alternatively or in addition, the interactive world logic section 745 (of FIG. 7) of the interactive incentivization application logic section 165 can cause the virtual world 900 to be displayed in response to the completion of a survey (e.g., 605 of FIG. 6), and/or in response to completing some other task associated with the clinical trial. The interactive incentivization application logic section 165 can receive inputs from the pediatric patient 130 via the touch-sensitive display screen 140, and can cause changes to the appearance of the virtual world 900 in response to those inputs. The various virtual items and features (e.g., 910, 915, 920, 925, 930, 935, 940) of the virtual world 900 can "awaken" and become interactable in response to the pediatric patient 130 completing corresponding tasks. In some embodiments, various virtual items and features (e.g., 910, 915, 920, 925, 930, 935, 940) can be become interactable with the pediatric patient 130 after scanning an individual achievement sticker (e.g., 120, 125), and/or completing some other task such as completing a survey. Accordingly, the virtual world 900 can become more interactive and fun for the pediatric patient 130 during the course of the clinical trial.

Figure 10:
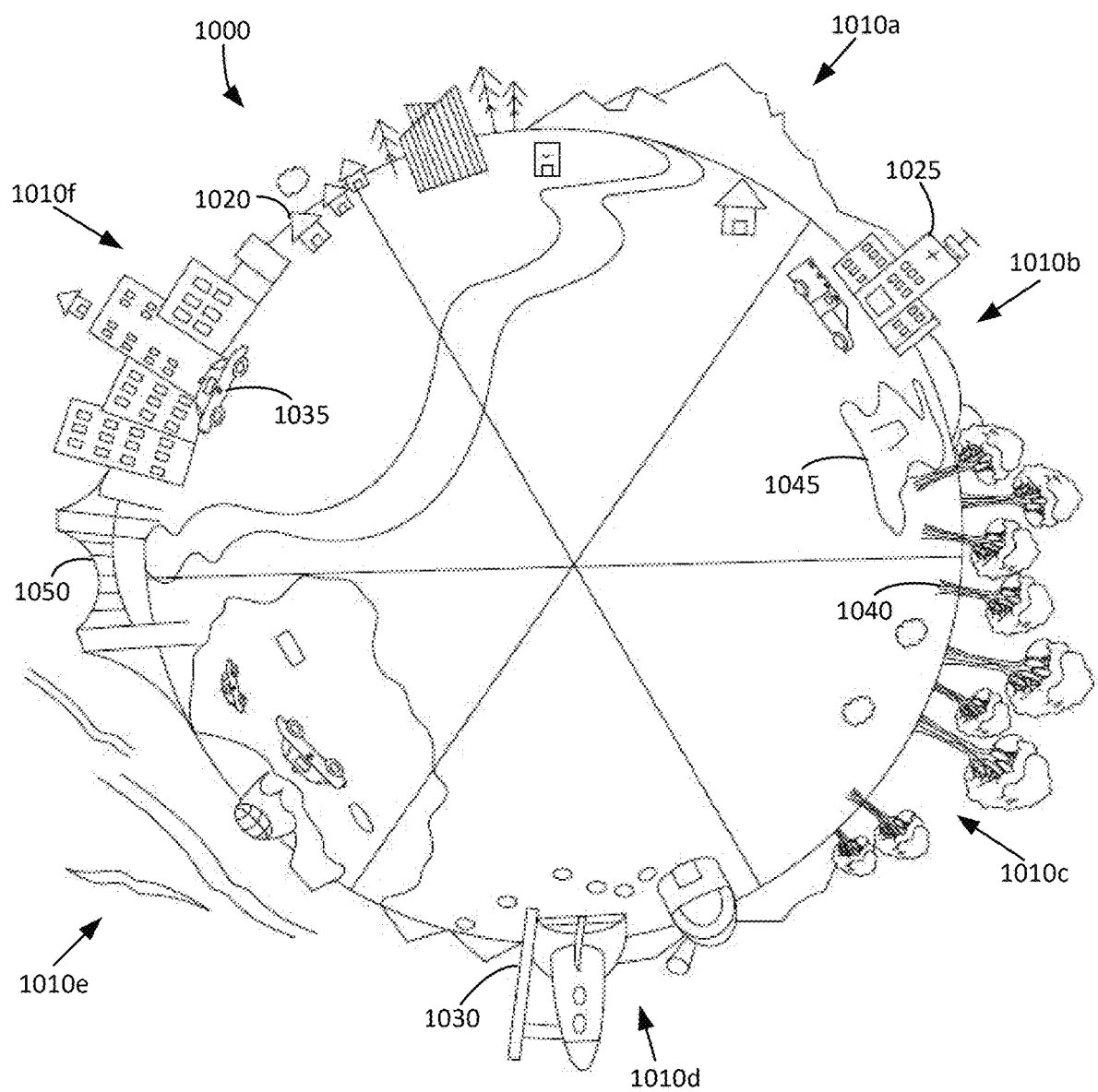
FIG. 10 illustrates another example virtual world of an interactive incentivization application logic section of a mobile device in accordance with some embodiments of the inventive concept.
Figure 10:
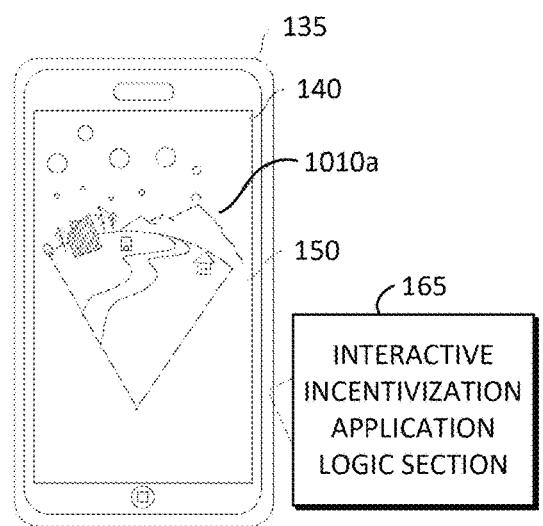

FIG. 10 illustrates another example virtual world 1000 of the interactive incentivization application logic section 165 of the mobile device 135 in accordance with some embodiments of the inventive concept. In some embodiments, the virtual world 1000 can be a global world divided into sections (e.g., 1010a, 1010b, 1010c, 1010d, 1010e, and 1010f). Any given section of the virtual world 1000 can be displayed at a given time on the touch-sensitive display screen 140 of the mobile device 135. For example, section 1010a can be displayed on the touch-sensitive display screen 140 of the mobile device 135 as shown in FIG. 10, but another section (e.g., 1010b, 1010c, 1010d, 1010e, and 1010f) can replace the section 1015 as the pediatric patent 130 proceeds through the virtual world 1000. For example, the pediatric patient 130 can tap the touch-sensitive display screen 140 of the mobile device 135, and drag the screen to the left or right to cause the virtual world 1000 to switch from one section to another, thereby revealing different portions of the virtual world 1000. Virtual buildings such as a virtual home 1020 and a virtual hospital 1025 can be included in the virtual world 1000. Other virtual items such as virtual rocket ship 1030 and/or a virtual automobile 1035 can be included in the virtual world 1000. Other virtual features such as a virtual tree 1040, a virtual lake 1045, and/or a virtual bridge 1050 can be included in the virtual world 1000.

The virtual world 1000 can be displayed on the touch-sensitive display screen 140 of the mobile device 135. The virtual world 1000 can be new reward content 150 that is unlocked for the pediatric patient 130 upon completion of a given task. In some embodiments, the pediatric patient 130 can interact with the virtual world 1000 using the touch-sensitive display screen 140. The interactive world logic section 745 (of FIG. 7) of the interactive incentivization application logic section 165 can cause the virtual world 1000 to be displayed in response to scanning an individual achievement sticker (e.g., 125 of FIG. 1), a uniquely identifiable patch (e.g., 410 of FIG. 4), and/or an individual achievement physical three-dimensional token (e.g., 505 of FIG. 5). Alternatively or in addition, the interactive world logic section 745 (of FIG. 7) of the interactive incentivization application logic section 165 can cause the virtual world 1000 to be displayed in response to the completion of a survey (e.g., 605 of FIG. 6), and/or in response to completing some other task associated with the clinical trial. The interactive incentivization application logic section 165 can receive inputs from the pediatric patient 130 via the touch-sensitive display screen 140, and can cause changes to the appearance of the virtual world 1000 in response to those inputs. The various virtual items and features (e.g., 1020, 1025, 1030, 1035, 1040, 1045, 1050) of the virtual world 1000 can "awaken" and become interactable in response to the pediatric patient 130 completing corresponding tasks. In some embodiments, various virtual items and features (e.g., 1020, 1025, 1030, 1035, 1040, 1045, 1050) can be become interactable with the pediatric patient 130 after scanning an individual achievement sticker (e.g., 120, 125), and/or completing some other task such as completing a survey. Accordingly, the virtual world 1000 can become more interactive and fun for the pediatric patient 130 during the course of the clinical trial.

Figure 11:
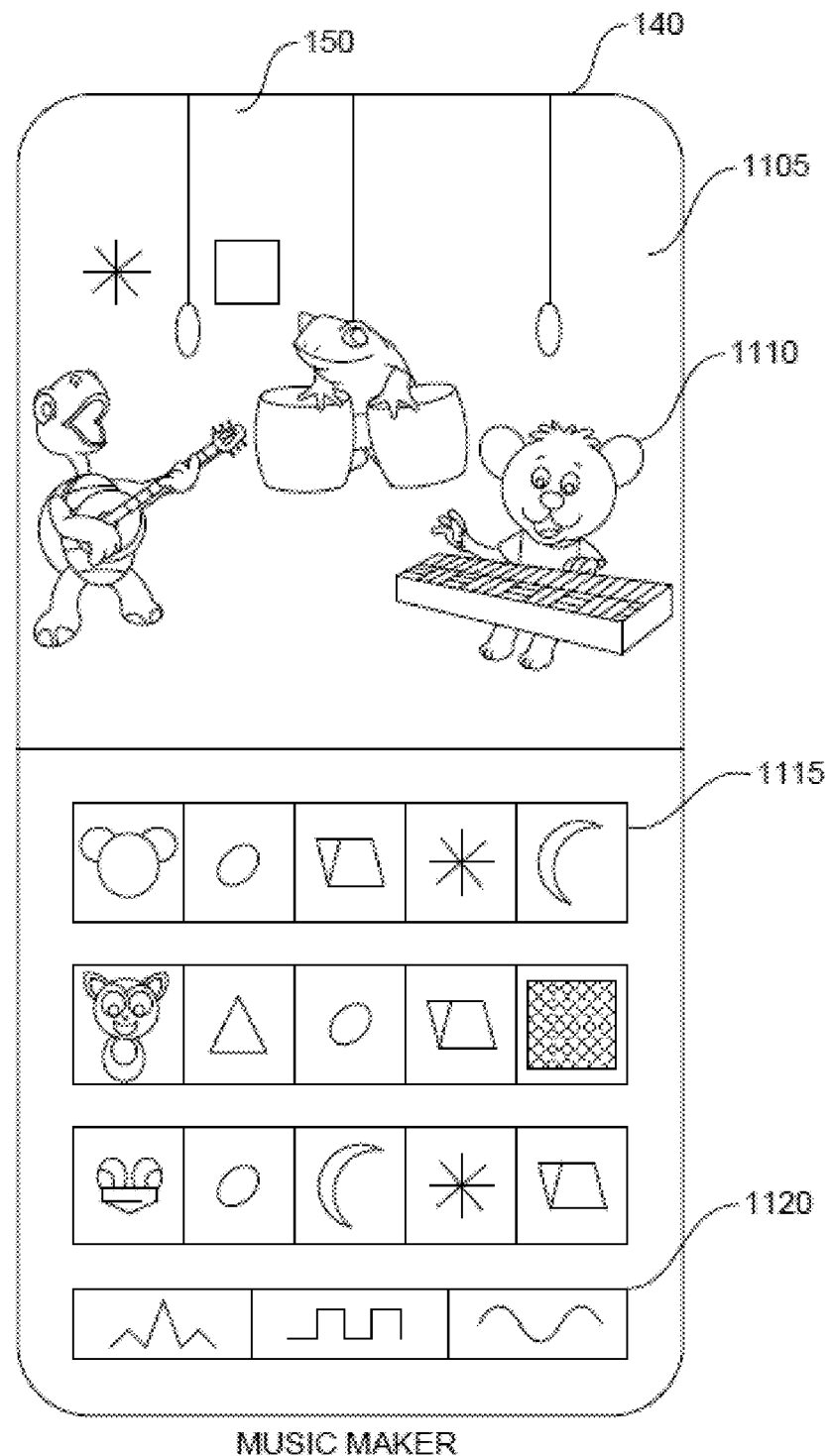
FIG. 11 illustrates an example music maker of an interactive incentivization application logic section of a mobile device in accordance with some embodiments of the inventive concept.

FIG. 11 illustrates an example music maker 1105 of an interactive incentivization application logic section 165 (of FIG. 1) of a mobile device 135 (of FIG. 1) in accordance with some embodiments of the inventive concept. The music maker 1105 can include still and/or animated images of character musicians (e.g., 1110), buttons or keys (e.g., 1115), sound graphs (e.g., 1120), or the like, and can be displayed on the touch-sensitive display screen 140 of the mobile device 135 (of FIG. 1). The character virtual hospital 1005 can be new reward content 150 that is unlocked for the pediatric patient 130 upon completion of a given task. In some embodiments, the pediatric patient 130 can interact with the virtual hospital 1005 using the touch-sensitive display screen 140. The interactive game logic section 735 (of FIG. 7) of the interactive incentivization application logic section 165 (of FIG. 1) can cause the music maker 1105 to be displayed in response to scanning an individual achievement sticker (e.g., 125 of FIG. 1), a uniquely identifiable patch (e.g., 410 of FIG. 4), and/or an individual achievement physical three-dimensional token (e.g., 505 of FIG. 5). Alternatively or in addition, the interactive game logic section 735 (of FIG. 7) of the interactive incentivization application logic section 165 can cause the music maker 1105 to be displayed in response to the completion of a survey (e.g., 605 of FIG. 6), and/or in response to completing some other task associated with the clinical trial. The interactive incentivization application logic section 165 can receive inputs from the pediatric patient 130 via the touch-sensitive display screen 140, and can cause changes to the appearance of the music maker 1105 in response to those inputs.

Figure 12:
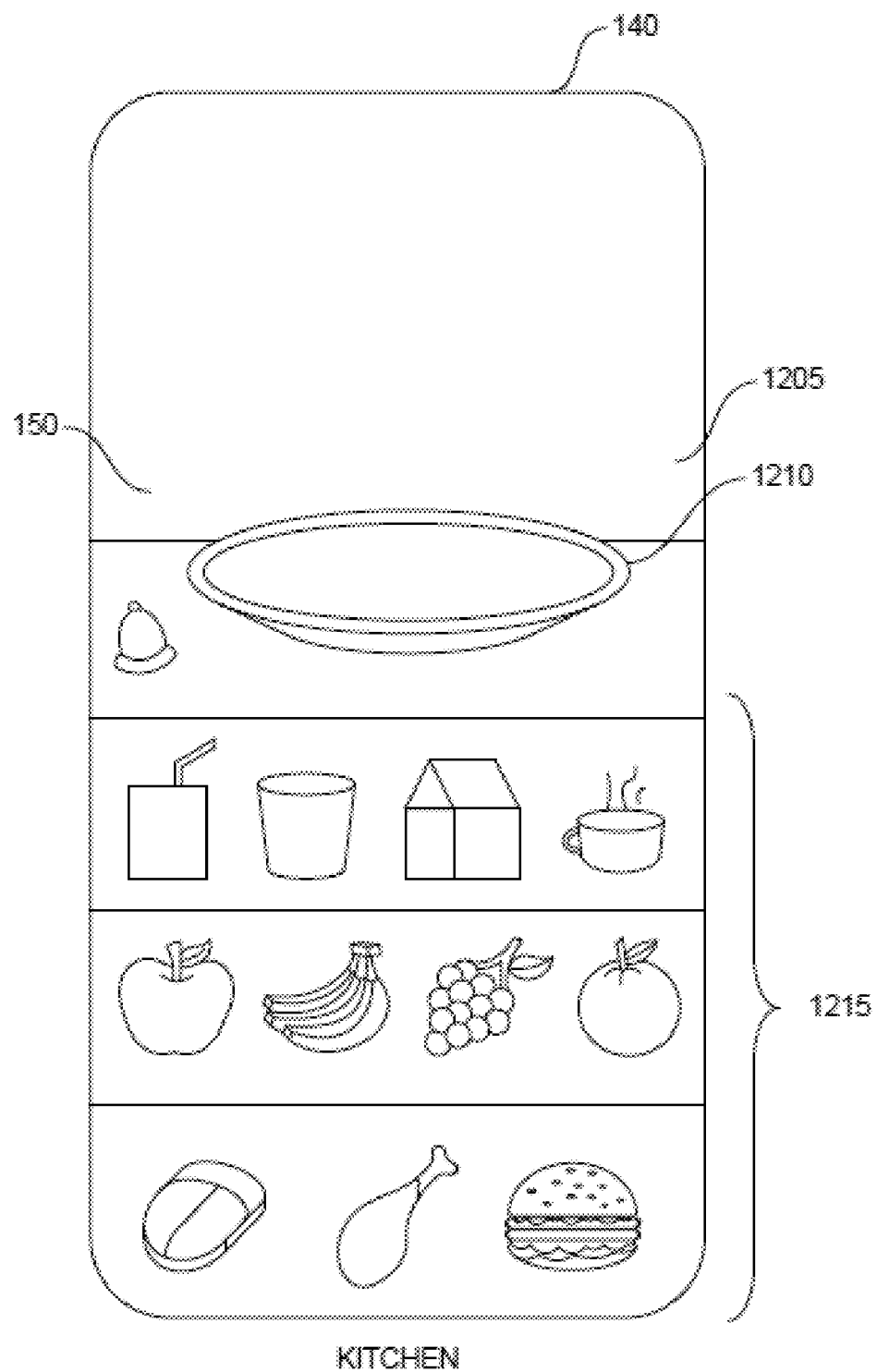
FIG. 12 illustrates an example virtual kitchen of an interactive incentivization application logic section of a mobile device in accordance with some embodiments of the inventive concept.

FIG. 12 illustrates an example virtual kitchen 1205 of an interactive incentivization application logic section 165 (of FIG. 1) of a mobile device 135 (of FIG. 1) in accordance with some embodiments of the inventive concept. The virtual kitchen 1205 can include still and/or animated images of bowls or plates (e.g., 1210), and other drink or food items (e.g., 1215), or the like, and can be displayed on the touch-sensitive display screen 140 of the mobile device 135 (of FIG. 1). The virtual kitchen 1205 can be new reward content 150 that is unlocked for the pediatric patient 130 upon completion of a given task. In some embodiments, the pediatric patient 130 can interact with the virtual kitchen 1205 using the touch-sensitive display screen 140. The interactive experience logic section 750 (of FIG. 7) of the interactive incentivization application logic section 165 (of FIG. 1) can cause the virtual kitchen 1205 to be displayed in response to scanning an individual achievement sticker (e.g., 125 of FIG. 1), a uniquely identifiable patch (e.g., 410 of FIG. 4), and/or an individual achievement physical three-dimensional token (e.g., 505 of FIG. 5). Alternatively or in addition, the interactive experience logic section 750 (of FIG. 7) of the interactive incentivization application logic section 165 can cause the virtual kitchen 1205 to be displayed in response to the completion of a survey (e.g., 605 of FIG. 6), and/or in response to completing some other task associated with the clinical trial. The interactive experience logic section 750 (of FIG. 7) of the interactive incentivization application logic section 165 can receive inputs from the pediatric patient 130 via the touch-sensitive display screen 140, and can cause changes to the appearance of the virtual kitchen 1205 in response to those inputs.

Figure 13:
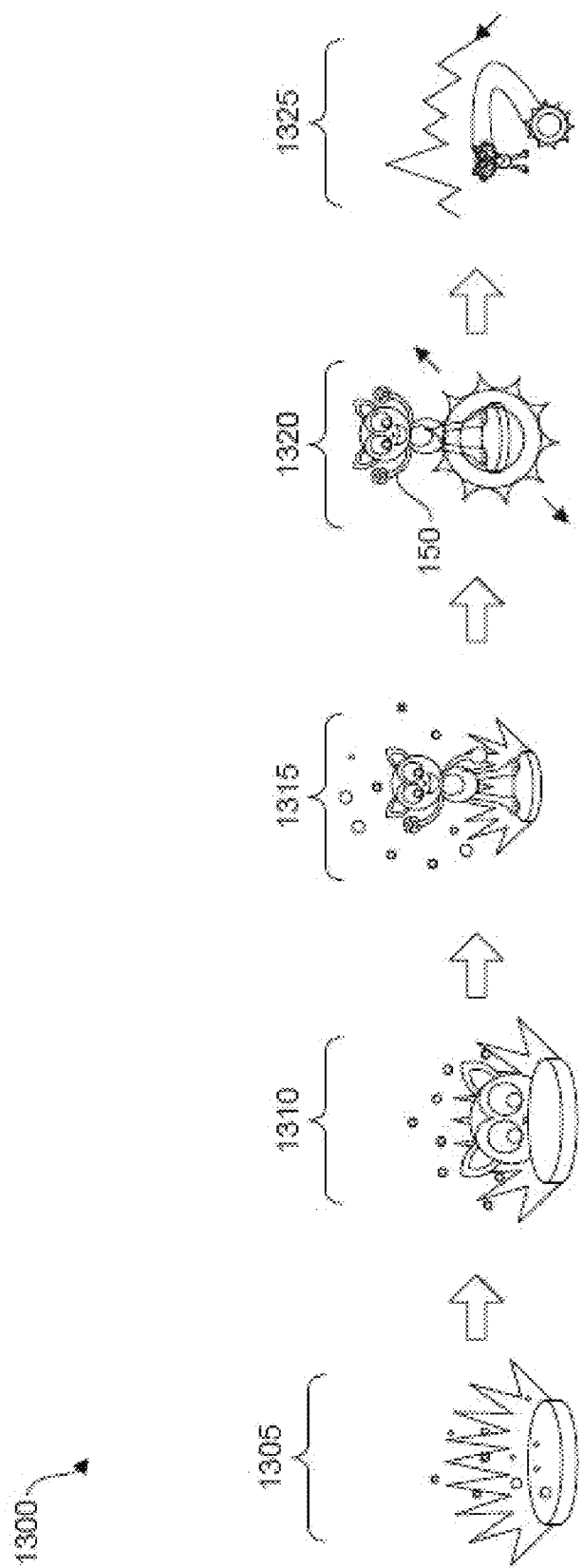
FIG. 13 illustrates an example character unlock sequence of an interactive incentivization application logic section of a mobile device in accordance with some embodiments of the inventive concept.

FIG. 13 illustrates an example character unlock sequence 1300 of an interactive incentivization application logic section of a mobile device in accordance with some embodiments of the inventive concept. The character unlock sequence 1300 can include various stages of unlock (e.g., 1305, 1310, 1315, 1320, 1325), beginning with an empty placeholder 1305, progressing to a fully revealed character 1320, and ending with the fully revealed character 1320 within a virtual world 1325 (e.g., within the virtual world 900 of FIG. 9). The character unlock sequence 1300 can be gradually displayed on the touch-sensitive display screen 140 of the mobile device 135 (of FIG. 1) in response to the pediatric patient 130 completing a series of tasks. The character unlock sequence 1300 can be new reward content 150 that is unlocked for the pediatric patient 130 upon completion of a given task. In some embodiments, the pediatric patient 130 can interact with the character unlock sequence 1300 using the touch-sensitive display screen 140. The interactive unlock sequence logic section 755 (of FIG. 7) of the interactive incentivization application logic section 165 (of FIG. 1) can cause the character unlock sequence 1300 to be displayed in response to scanning an individual achievement sticker (e.g., 125 of FIG. 1), a uniquely identifiable patch (e.g., 410 of FIG. 4), and/or an individual achievement physical three-dimensional token (e.g., 505 of FIG. 5). Alternatively or in addition, the interactive unlock sequence logic section 755 (of FIG. 7) of the interactive incentivization application logic section 165 can cause the character unlock sequence 1300 to be displayed in response to the completion of a survey (e.g., 605 of FIG. 6), and/or in response to completing some other task associated with the clinical trial. The interactive unlock sequence logic section 755 (of FIG. 7) of the interactive incentivization application logic section 165 can receive inputs from the pediatric patient 130 via the touch-sensitive display screen 140, and can cause changes to the appearance of the character unlock sequence 1300 in response to those inputs.

Figure 14:
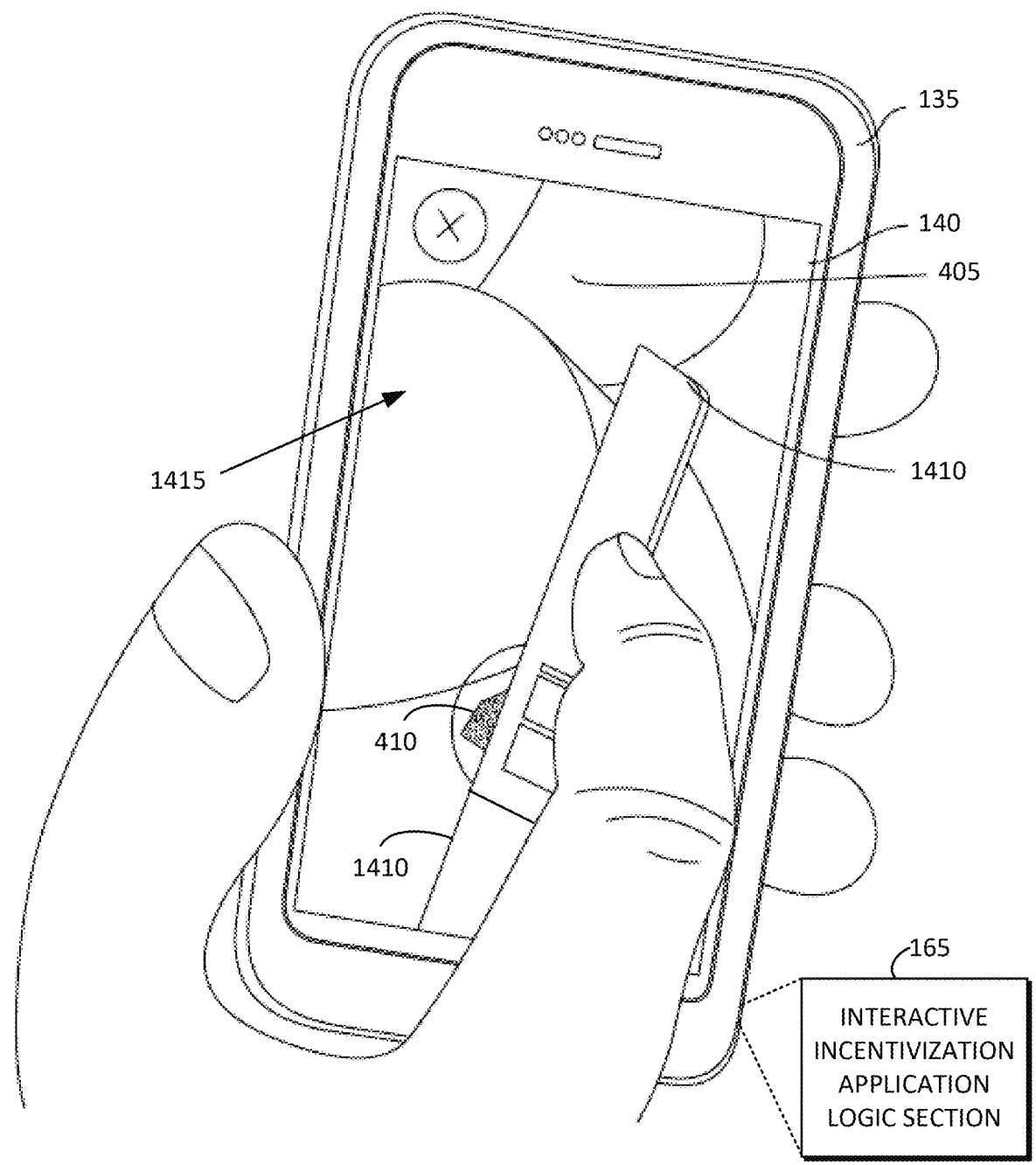
FIG. 14 illustrates an example digital virtual insulin pen of an interactive incentivization application logic section of a mobile device in accordance with some embodiments of the inventive concept.

FIG. 14 illustrates an example digital virtual insulin pen 1410 of an interactive incentivization application logic section 165 of a mobile device in accordance with some embodiments of the inventive concept. The medical procedure simulation logic section 715 (of FIG. 7) of the interactive incentivization application logic section 165 can cause a still frame 1415 including a scanned uniquely identifiable patch 410 and at least a portion of the body of the interactive companion toy 405 to be displayed on the display screen 140. The medical procedure simulation logic section 715 (of FIG. 7) of the interactive incentivization application logic section 165 can display or cause to be displayed one or more digital virtual medical tools (e.g., 1410) superimposed over the still frame 1415. For example, a digital virtual disease care tool such as a digital virtual insulin pen 1410 can be presented to the pediatric patient 130 through the touch-sensitive display screen 140. By way of other examples, the digital virtual medical tools (e.g., 1410) can include a digital virtual stethoscope, a digital virtual blood pressure cuff, and/or a digital virtual X-ray machine, or the like.

The medical procedure simulation logic section 715 (of FIG. 7) of the interactive incentivization application logic section 165 can receive one or more interactive gestures from the pediatric patient 130 via the touch-sensitive display screen 140 to manipulate the one or more digital virtual medical tools (e.g., 1410) to administer virtual medical care to the interactive companion toy 405. The medical procedure simulation logic section 715 (of FIG. 7) of the interactive incentivization application logic section 165 can display or cause to be displayed the digital virtual insulin pen 1410 superimposed over the still frame 1415. The medical procedure simulation logic section 715 (of FIG. 7) of the interactive incentivization application logic section 165 can receive one or more sliding gestures from the pediatric patient 130 via the touch-sensitive display screen 140 to move or otherwise manipulate the digital virtual insulin pen 1410.

Figure 15:
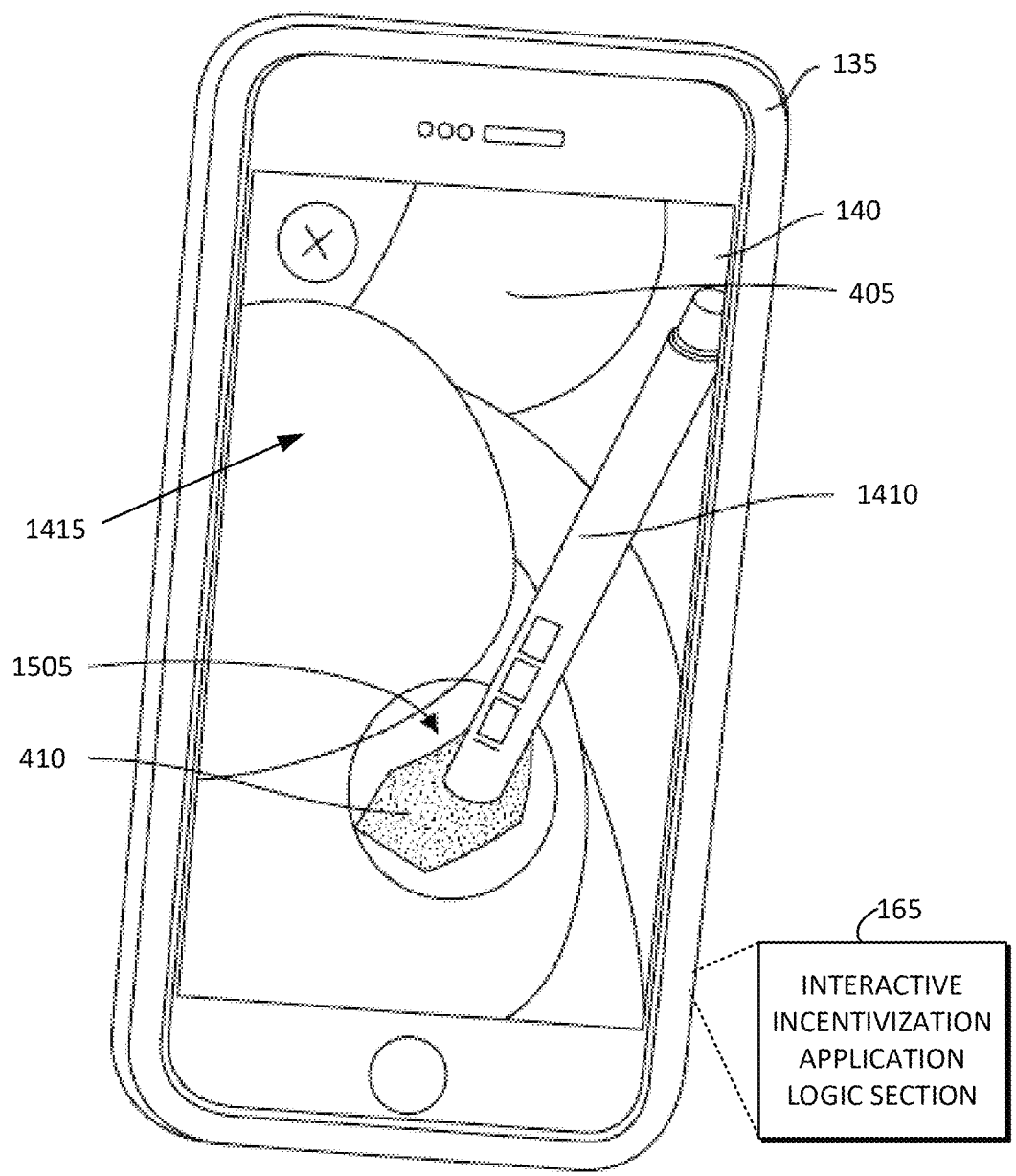
FIG. 15 illustrates an example digital virtual rubbing alcohol swab of an interactive incentivization application logic section of a mobile device in accordance with some embodiments of the inventive concept.

FIG. 15 illustrates an example digital virtual rubbing alcohol swab 1505 of an interactive incentivization application logic section 165 of a mobile device 135 in accordance with some embodiments of the inventive concept. As shown in FIG. 15, the digital virtual rubbing alcohol swab 1505 can be presented to the pediatric patient 130 through the touch-sensitive display screen 140. The pediatric patient 130 can touch and move the digital virtual rubbing alcohol swab 1505 over to a tip of the digital virtual insulin pen 1410 to clean it.

More specifically, the one or more digital virtual medical tools can include a digital virtual rubbing alcohol swab 1505, for example. The medical procedure simulation logic section 715 (of FIG. 7) of the interactive incentivization application logic section 165 can display or cause to be displayed the digital virtual rubbing alcohol swab 1505 superimposed over the still frame 1415. The medical procedure simulation logic section 715 (of FIG. 7) of the interactive incentivization application logic section 165 can receive one or more touch and move gestures from the pediatric patient 130 via the touch-sensitive display screen 140 to cause the digital virtual rubbing alcohol swab 1505 to clean a tip of the digital virtual insulin pen 1410, for example.

Figure 16:
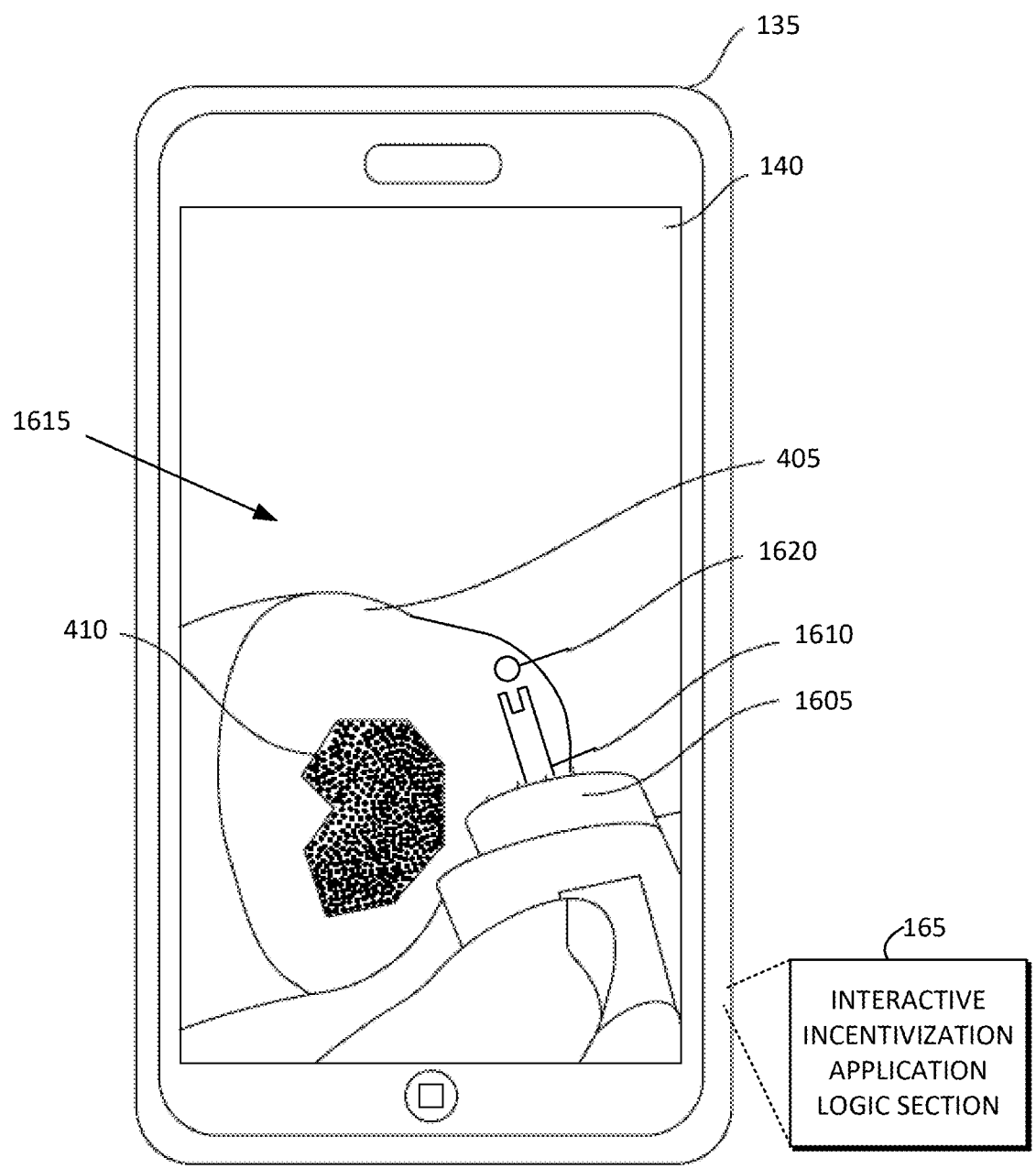
FIG. 16 illustrates an example digital virtual glucometer of an interactive incentivization application logic section of a mobile device in accordance with some embodiments of the inventive concept.

FIG. 16 illustrates an example digital virtual glucometer 1605 of an interactive incentivization application logic section 165 of a mobile device 135 in accordance with some embodiments of the inventive concept. The interactive incentivization application logic section 165 can present the digital virtual glucometer 1605 and a digital virtual strip 1610 over a still frame 1615. The pediatric patient 130 can be provided with the ability to drag the digital virtual strip 1610 to the digital virtual glucometer 1605. The digital virtual glucometer 1605 and the digital virtual strip 1610 can be used to test digital virtual blood 1620. The interactive incentivization application logic section 165 can display or cause to be displayed one or more digital virtual medical tools (e.g., 1605, 1610) superimposed over the still frame 1615. For example, a digital virtual disease care tool such as the digital virtual glucometer 1605 can be presented to the pediatric patient 130 through the touch-sensitive display screen 140.

Figure 17:
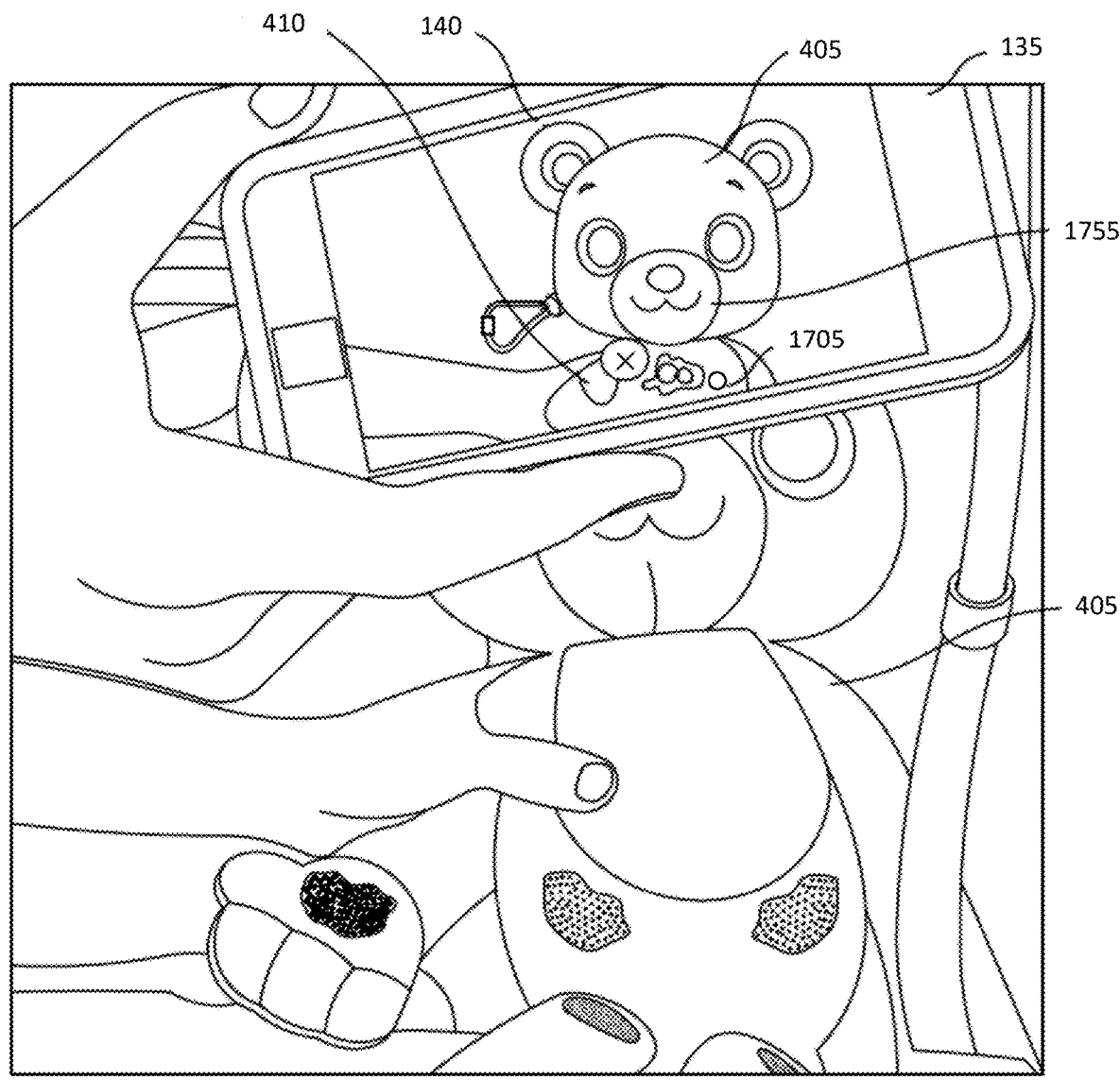
FIG. 17 illustrates example digital virtual food of an interactive incentivization application logic section of a mobile device in accordance with some embodiments of the inventive concept.

FIG. 17 illustrates example digital virtual food 1705 of an interactive incentivization application logic section 165 of a mobile device 135 in accordance with some embodiments of the inventive concept. The interactive companion toy 405 can be virtually fed with digital virtual food 1705. Food choices are often a crucial part of caring for a chronic illness during a clinical trial, such as for Type I diabetes, food allergies, obesity, or the like. Feeding the interactive companion toy 405 with the digital virtual food 1705 teaches the pediatric patient 130 what foods are appropriate, and how they impact or help their own body. The interactive experience logic section 750 of the interactive incentivization application logic section 165 can provide the ability for the pediatric patient 130 to move or drag particular digital virtual food items 1705 to a mouth 1755 of the interactive companion toy 405 in the augmented reality combination of the actual image of the interactive companion toy 405 combined with the digital virtual items (e.g., 1705). In this manner, the interactive companion toy 405 can be virtually fed with the selected digital virtual food items 1705.

In some embodiments, the interactive experience logic section 750 of the interactive incentivization application logic section 165 can cause a speaker (e.g., 1730 of FIG. 17A) of the mobile device 135 to emit a message as if it were coming from the interactive companion toy 405 regarding at least one symptom of shakiness, dizziness, or confusion. The interactive experience logic section 750 of the interactive incentivization application logic section 165 can cause the digital virtual food 1705 and the digital virtual plate 1710 to be displayed on the touch-sensitive display screen 140. The interactive experience logic section 750 of the interactive incentivization application logic section 165 can receive one or more touch and move gestures from the pediatric patient 130 via the touch-sensitive display screen 140 to cause a selection of the digital virtual food 1705 to be moved onto the digital virtual plate 1710. The interactive experience logic section 750 of the interactive incentivization application logic section 165 can receive one or more touch and move gestures from the pediatric patient 130 via the touch-sensitive display screen 140 to cause the digital virtual plate 1710 having the digital virtual food 1705 to be moved toward the mouth 1755 of the interactive companion toy 405 to virtually feed the interactive companion toy 405 with the selection of the digital virtual food 1705. The interactive experience logic section 750 of the interactive incentivization application logic section 165 can cause a representation of a number of carbohydrates 1750 associated with the selection of the digital virtual food 1705 on the digital virtual plate 1710 to be displayed on the touch-sensitive display screen 140.

In this manner, education is provided to children with illness about how to stay healthy during the clinical trial. Comfort and emotional support are also provided. Fun game-play and entertainment are wrapped together with useful and uplifting education during the clinical trial. Information about the child's adherence with their medical procedures can be collected, logged, and stored. The information can be transmitted to a healthcare professional, a caregiver, a clinical trial administrator, a pharmaceutical company, or the like, for further analysis. The systems disclosed herein can be used by doctors, nurses, and medical staff to alleviate patient stress during the clinical trial.

Figure 18:
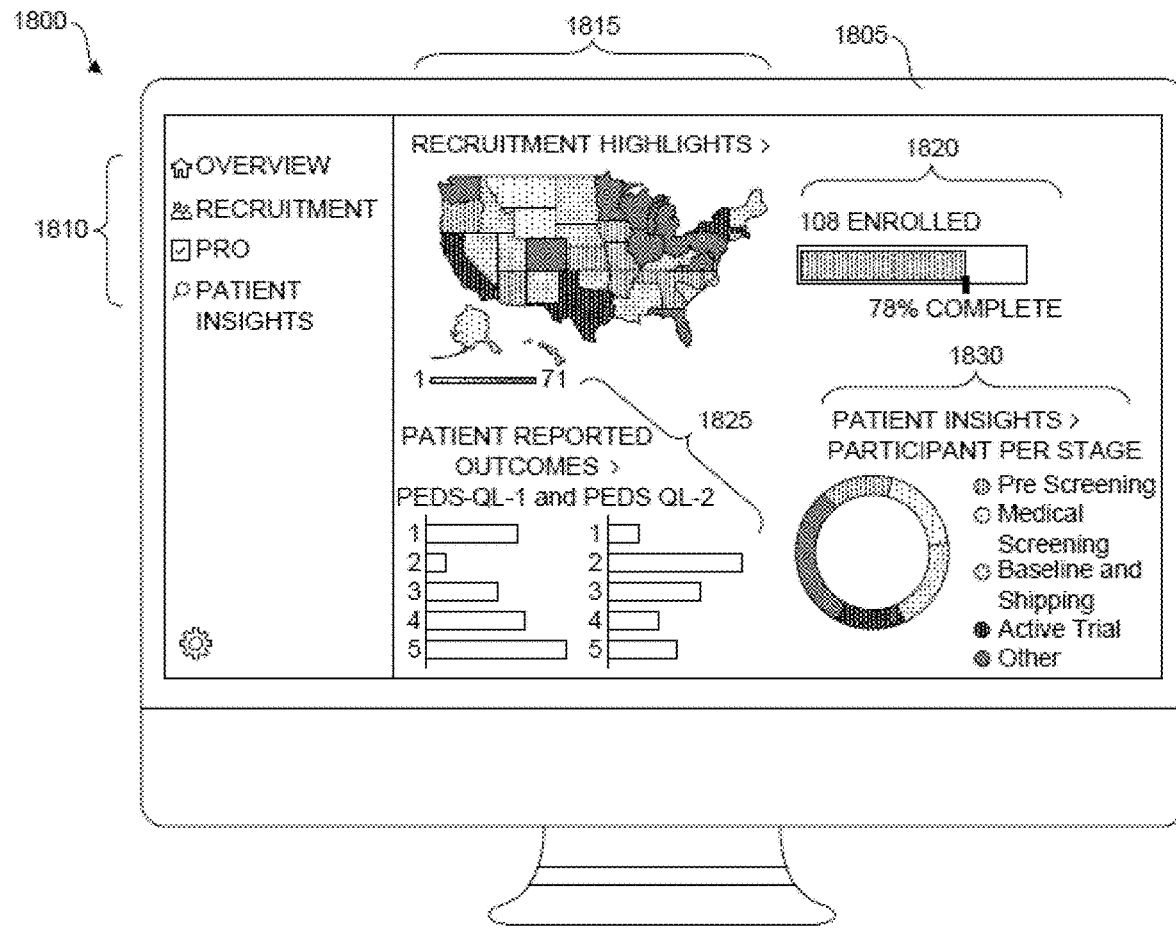
FIG. 18 illustrates an example clinical trial cloud-based portal in accordance with some embodiments of the inventive concept.

FIG. 18 illustrates an example clinical trial cloud-based portal 1800 in accordance with some embodiments of the inventive concept. The clinical trial cloud-based portal 1800 enables clinical trial managers, pharmaceutical companies, and/or contract research organizations an ability to visualize all of the data collected from the use of the interactive companions (e.g., 405) by one or more of the pediatric patients associated with the clinical trial. Insights can be drawn about behaviors of the pediatric patients (e.g., 130 of FIG. 1), levels of understanding of the pediatric patients about a disease that they are being treated for, and/or whether the pediatric patients are complying with appropriate medication instructions and/or usage.

Real-time insights about how the pediatric patients are using the interactive companions can be observed through the clinical trial cloud-based portal 1800. Real-time survey data can be collected from the interactive incentivization application logic section (e.g., 165 of FIG. 1) of the mobile devices used by the pediatric patients during the clinical trial. The real-time survey data can be aggregated, summarized, and displayed via the clinical trial cloud-based portal 1800. The clinical trial cloud-based portal 1800 can display, for example, one or menu options 1810, recruitment highlights 1815, number of enrolled pediatric patients and completion percentage 1820, patient-reported outcomes 1825, and/or patient insights 1830 such as percentages of patient participation for each stage of the clinical trial.

Figure 19:
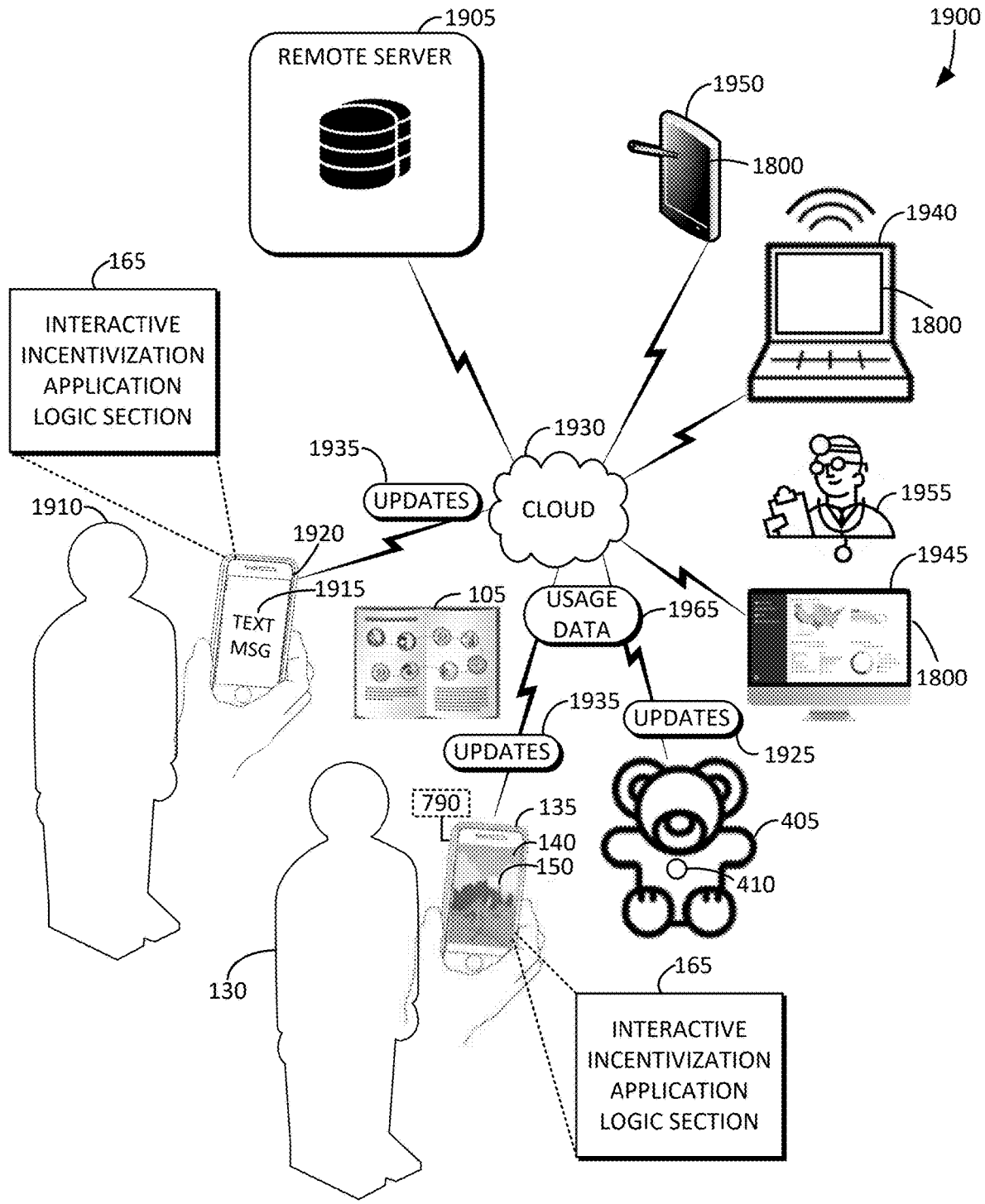
FIG. 19 illustrates an example clinical trial cloud-based system in accordance with some embodiments of the inventive concept.

FIG. 19 illustrates an example clinical trial cloud-based system 1900 in accordance with some embodiments of the inventive concept. The pediatric patient 130 can be given the interactive companion toy 405 when they enter a healthcare facility such as a hospital to begin treatment in connection with a clinical trial. It will be understood that while in this example the interactive companion toy 405 is shown to be in the form of a bear, any suitable shape or kind of toy, such as a zebra, doll or other animal, can be used together with the other inventive aspects disclosed herein.

The interactive companion toy 405 can work in conjunction with the interactive incentivization application logic section 165 of the mobile device 135 to mirror one or more protocols of the clinical trial. In other words, the system 1900 enables the pediatric patient 130 to interact with the interactive companion toy 405 and experience the same or similar medical procedures in a play environment that are concurrently being experienced by the pediatric patient 130 during the course of the real clinical trial. It is as if the interactive companion toy 405 is also undergoing the clinical trial in the eyes of the pediatric patient 130. The system 1900 can be specific and/or customized to one or more protocols of the particular clinical trial. In other words, the system 1900 can provide different customized experiences for the pediatric patient 130 depending on the different kinds of clinical trials. The interactive companion toy 405 can be a "friend just like you" for the pediatric patient 130. The interactive incentivization application logic section 165 of the mobile device 135 can cause to be scanned one or more uniquely identifiable patches 410 on the interactive companion toy 405, which can enable the pediatric patient 130 to provide medical care to the interactive companion toy 405 in an augmented reality environment.

When the pediatric patient 130 first accesses the interactive incentivization application logic section 165 of the mobile device 135, the pediatric patient 130 can enter a unique ID 790 that can be assigned to them in relation to the particular clinical study. Accordingly, a specific and/or customized version of the interactive incentivization application logic section 165 can be used to serve the pediatric patient 130 for that particular clinical study that corresponds to the unique ID 790. One or more medical procedures specific to that particular clinical study can be presented in an augmented reality environment to the pediatric patient 130. Depending on the specific one or more protocols associated with the particular clinical study, the interactive incentivization application logic section 165 can provide a specific and/or customized augmented reality experience that substantially match the real-world experiences that the pediatric patient 130 will undergo during the particular clinical trial.

The interactive incentivization application logic section 165 of the mobile device 135 can be customized to match one or more specific clinical trial protocols to the augmented reality environment. For example, the interactive incentivization application logic section 165 of the mobile device 135 can be customized to match a number of site visits, one or more site protocols, and/or one or more at-home protocols associated with the clinical trial. By way of another example, in a case where the clinical study involves twelve site visits in which the pediatric patient 130 will have their blood drawn, then the interactive companion toy 405 can be configured with a blood draw functionality, a virtual hospital can be modified to reflect a blood draw, and/or the physical patient passport 105 can be configured to have twelve unlockable individual achievement sticker placeholders 115—one for each blood draw experience.

The one or more parents 1910 of the pediatric patient 130 can opt in to receive one or more text messages 1915 via a mobile device 1920. The mobile device 1920 can include the interactive incentivization application logic section 165, which can coordinate the receipt of the one or more text messages 1915. In some embodiments, the one or more text messages 1915 are short message/messaging service (SMS) messages. The one or more text messages 1915 can help the one or more parents 1910 to facilitate play with their child, the pediatric patient 130, and/or with the interactive companion toy 405, particularly at an in-home environment when there are fewer or no clinical trial personnel to provide assistance. In some embodiments, the one or more text messages 1915 can be automatically sent to the one or more parents 1910 the day before a site visit to help families alleviate anxiety through medical play with the interactive companion toy 405 prior to the actual site visit.

The one or more text messages 1915 can include, for example, instructions on which medical play to practice on the interactive companion toy 405 prior to the actual site visit, and how to carry out that medical play using the interactive companion toy 405 and/or with the interactive incentivization application logic section 165 of the mobile device 135. By way of another example, the one or more text messages 1915 can bring expertise from fields such as child life to the one or more parents 1910, helping the one or more parents 1910 to steer the pediatric patient 130 in using the interactive companion toy 405 in a correct manner to reduce anxiety for their children. In some embodiments, the one or more text messages 1915 can be automatically sent to the mobile device 1920 and/or to the mobile device 135 from a remote server 1905 via the cloud 1930.

The interactive companion toy 405 can receive software updates 1925 from the remote server 1905 via the cloud 1930. The interactive incentivization application logic section 165 of the mobile device 135 and/or the mobile device 1920 can receive software updates 1935 from the remote server 1905 via the cloud 1930. The clinical trial cloud-based portal 1800 can be provided from the remote server 1905 via the cloud 1930. The clinical trial cloud-based portal 1800 can be provided on a laptop computer 1940, a desktop computer 1945, a mobile device such as smart tablet or phone 1950, or the like. Usage data 1965 associated with use of the interactive incentivization application logic section 165 and/or the interactive companion 405 can be sent to the remote server 1905, which can process, aggregate, and/or summarize the usage data 1965. Clinical trial managers 1955, pharmaceutical companies, and/or contract research organizations can access the clinical trial usage data 1965 in summarized form via the clinical trial cloud-based portal 1800 using the laptop computer 1940, the desktop computer 1945, the smart tablet or phone 1950, or the like.

Figure 20:
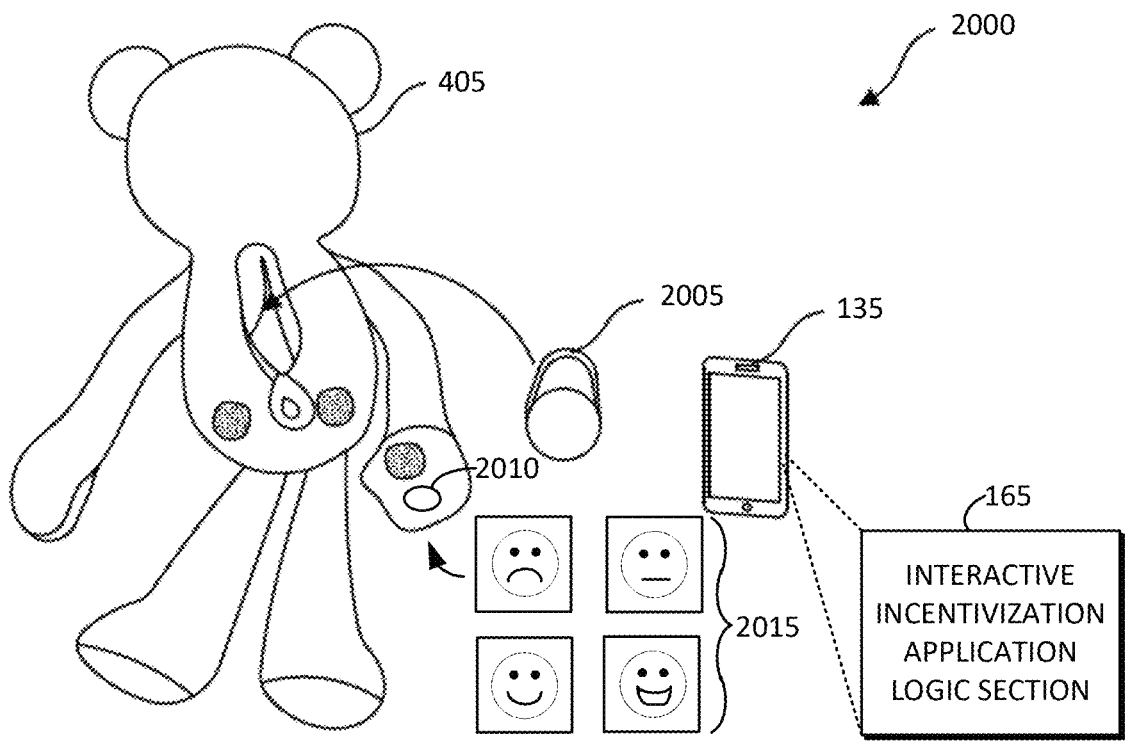
FIGS. 20 and 21 illustrate an example system for creating an interactive augmented reality experience to simulate medical procedures in accordance with some embodiments of the inventive concept.
Figure 21:
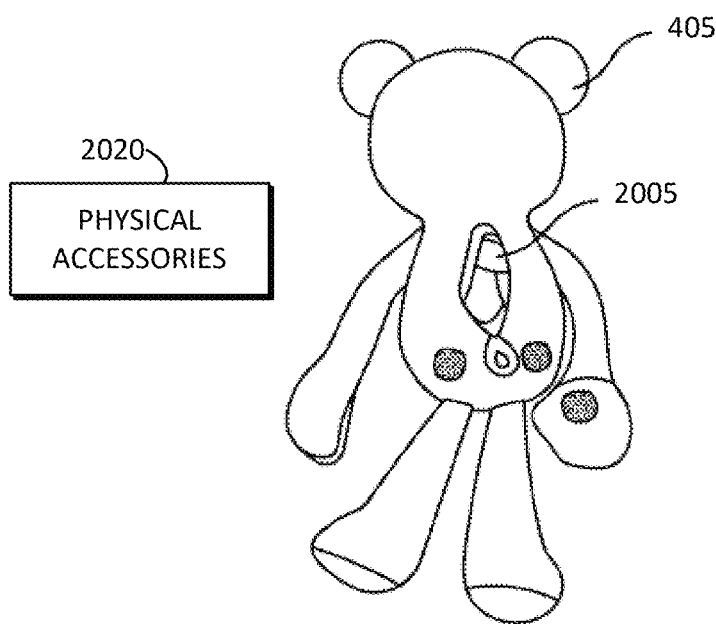

FIGS. 20 and 21 illustrate an alternative system 2000 for creating an interactive augmented reality experience for the pediatric patient 130 to simulate medical procedures in accordance with some embodiments of the inventive concept. In the system 2000, the interactive companion toy 405 has a computer unit 2005, which can include a speaker and/or wireless connectivity. In this embodiment the pediatric patient 130 can administer virtual disease care to their interactive companion toy 405 using their mobile device 135. Audio and/or visual feedback can be provided to the pediatric patient 130 directly from the computer unit 2005 embedded in the interactive companion toy 405 itself, or in some embodiments, from the mobile device 135 as well.

In another alternative embodiment, the interactive incentivization application logic section 165 can further collect information about the pediatric patient's 130 medical condition. This information can either be collected through direct user input, optical character recognition, wireless communication with a medical device, and/or questions that the interactive incentivization application logic section 165 asks the pediatric patient 130. In this embodiment, the medical information can be stored for later transmission to doctors and caregivers.

In another alternative embodiment, user pediatric patients 130 can practice performing medical procedures on themselves. The interactive incentivization application logic section 165 can recognize the pediatric patient's body parts either through object recognition, or through temporary tattoos that the pediatric patient 130 places on their body. The pediatric patient 130 can then use the aforementioned process to practice disease care on themselves using the digital virtual disease care tools within the augmented reality experience using the system 1900 or 2000 as described herein.

In another alternative embodiment, the process described can be used to educate the pediatric patient 130 about medical procedures that they may encounter during the clinical trial. In this embodiment, the interactive companion toy 405 can be used by a doctor to demonstrate a procedure, such as removing a cast, in order to alleviate patient stress.

In an alternate embodiment, the interactive companion toy 405 can come with physical accessories 2020 such as a real-life glucometer, insulin pen, thermometer, inhaler, or the like. When the physical, non-virtual, accessories 2020 are viewed using the mobile device 135, they can come to life with additional information. For example, the pediatric patient 130 can look at the physical non-electronic glucometer 2020 using the display of the mobile phone to see their plush toy's blood sugar level. In other words, the information about the blood sugar level (or other medical information suitable for the physical tool being viewed) can be displayed on the display of the mobile device 135.

In some embodiments, the interactive companion toy 405 can include a sensor 2010 that is either attached to a surface thereof, or is embedded inside. The pediatric patient 130 can be given one or more physical accessories such as Likert pain scale cards 2015. The Likert pain scale cards 2015 can include various face emojis indicating various levels of happiness or pain. The pediatric patient 130 can touch one of the physical accessories 2015 to the interactive companion toy 405 based on how they are feeling. The interactive companion toy 405 can sense which physical accessory 2015 was touched to it, and can record how the pediatric patient 130 is feeling based on this interaction. In some embodiments, the interactive companion toy 405 can audibly ask the pediatric patient 130 how much pain they experienced on a given day, and the pediatric patient 130 can tap the appropriate Likert scale emoji card 2015 to the interactive companion toy 405 to answer. The computer unit 2005 can include internal electronics (e.g., near-field communications chip) capable of reading and/or deciphering which physical accessory 2015 is tapped or is near-to the interactive companion toy 405. In some embodiments, the interactive companion toy 405 itself includes a display and can display in writing the question for the pediatric patient 130. In some embodiments, the incentivization application logic section 165 causes the question to be displayed in writing on the touch-sensitive display screen 140 of the mobile device 135, and the pediatric patient 130 responds by tapping the physical accessory to the interactive companion toy 405. In some embodiments, the interactive companion toy 405 can audibly ask the pediatric patient 130 a particular question while the incentivization application logic section 165 simultaneously causes the question to be displayed in writing on the touch-sensitive display screen 140 of the mobile device 135. The interactive companion toy 405 can store information regarding which of the one or more Likert pain scale cards comes into contact or close contact to the interactive companion toy 405. The interactive companion toy 405 can transmit the information to the remote server (e.g., 1905 of FIG. 19), which can process, aggregate, and/or summarize the information, and provide insights via the clinical trial cloud-based portal 1800.

Figure 22:
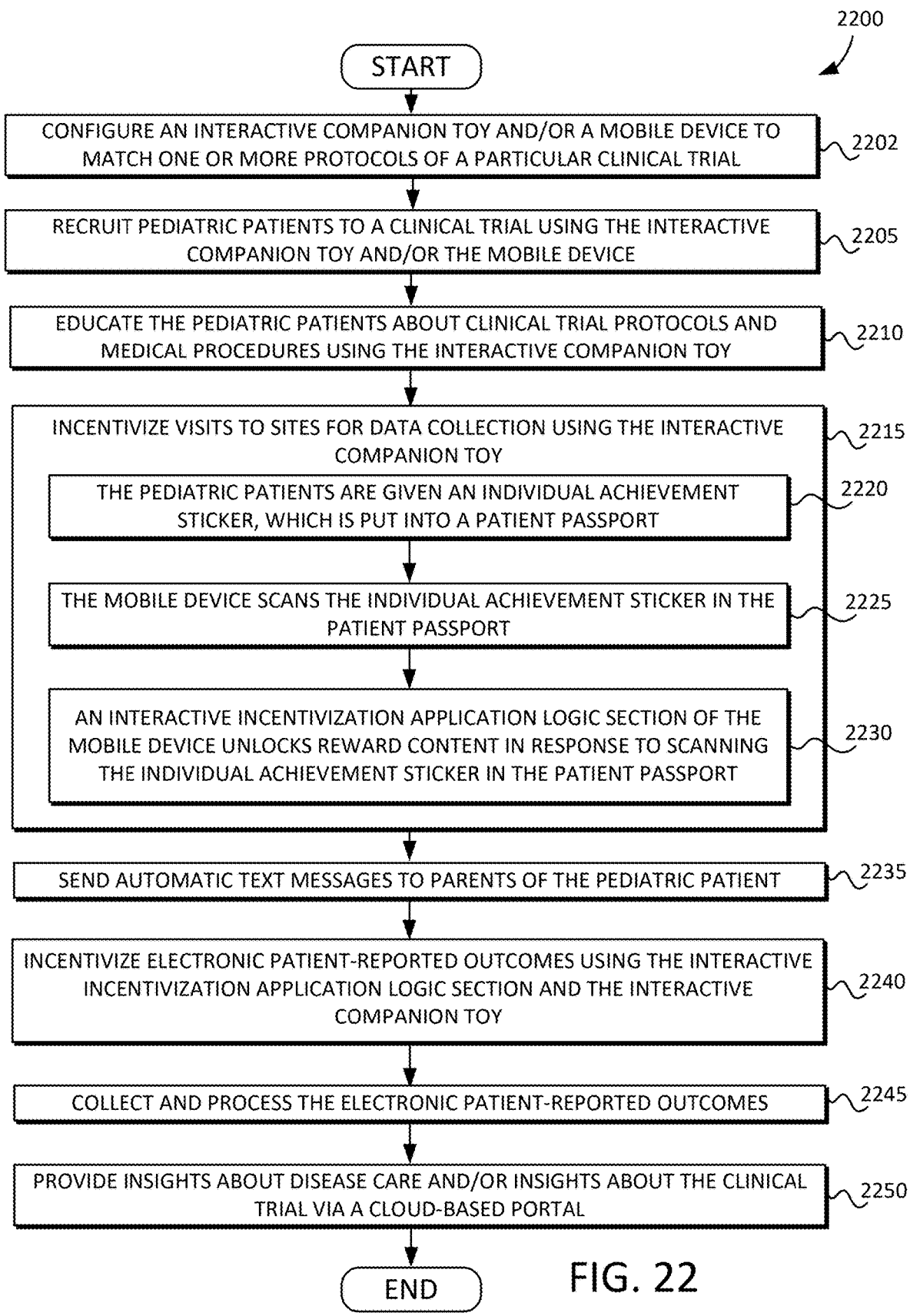
FIG. 22 is a flow diagram illustrating a technique for aiding in the recruitment, retention, and compliance in medical clinical trials in accordance with some embodiments of the inventive concept.

FIG. 22 is a flow diagram 2200 illustrating a technique for aiding in the recruitment, retention, and compliance in medical clinical trials in accordance with some embodiments of the inventive concept. Reference is now made to FIGS. 1, 4, 6, 19, and 22.

At 2202, the interactive companion toy 405 and/or the mobile device 135 can be configured to match one or more protocols of a particular clinical trial. At 2205, pediatric patients (e.g., 130) can be recruited to a clinical trail using the interactive companion toy 405 and/or the mobile device 135. The interactive incentivization application logic section 165 of the mobile device 135 can provide interactive content via the touch-sensitive display screen 140 regarding one or more study protocols or medical procedures that may be experienced during the course of the clinical trial. In addition, the consent and assent logic section 710 (of FIG. 7) of the interactive incentivization application logic section 165 can aid in recruiting and retention of the pediatric patient 130 and one or more parents 1910 by explaining what to expect during the clinical trial, and can obtain the consent and/or assent of the pediatric patient 130 and/or the one or more parents 1910 to participate in the clinical trial.

The interactive incentivization application logic section 165 can include a walk-through mode in which one or more protocols of the clinical trial can be presented to the pediatric patient 130 and one or more parents 1910 via the touch-sensitive display screen 140 of the mobile device 135. In some embodiments, the walk-through mode can be presented concurrently with live personnel onsite explaining the procedures and protocols in-person. The pediatric patient 130 and the one or more parents 1910 can go through each medical procedure and get a better understanding of what they are committing to. The pediatric patient 130 and the one or more parents 1910 can complete the consent and/or assent process digitally using the consent and assent logic section 710 (of FIG. 7) of the interactive incentivization application logic section 165 of the mobile device 135 after completing the walk-through mode.

At 2210, the pediatric patient 130 and/or the one or more parents 1910 can be educated about clinical trial protocols and medical procedures using the interactive companion toy 405. After the pediatric patient 130 is enrolled in a particular study, the personnel on-site can explain the clinical trial protocol to the pediatric patient 130 using the interactive companion toy 405. The pediatric patient 130 can mimic one or more medical procedures on the interactive companion toy 405 while the live personnel explain the same medical procedures in-person, for example. Alternatively or in addition, the patient passport 105 can be used during this phase to incentivize the education about the clinical trial. For example, the pediatric patient 130 can place one or more individual achievement stickers (e.g., 120, 125) corresponding to a given medical procedure in the clinical trial into their patient passport 105. By doing so, the pediatric patient 130 can build one or more at-home and/or on-site protocols, thereby helping the pediatric patient 130 to visualize exactly what they will be experiencing and doing at each location. As part of this process, the pediatric patient 130 and/or the one or more parents 1910 can develop a coping plan for how to prepare for scary medical procedures that they might encounter during the course of the clinical trial. The personnel can use the interactive companion toy 405 and/or the interactive incentivization application logic section 165 to demonstrate the at-home and/or on-site protocols.

At 2215, patient visits to sites for data collection can be incentivized using the interactive companion toy 405. At 2220, the pediatric patient 130 can be given an individual achievement sticker (e.g., 120, 125) for physically visiting the site location at which the clinical trial is being held. The pediatric patient 130 can put the individual achievement sticker (e.g., 120, 125) in the patient passport 105 as described above. At 2225, the pediatric patient can use the mobile device 135 to scan the individual achievement sticker (e.g., 120, 125) in the patient passport 105, as also described above. The scan handler logic section 705 (of FIG. 7) can handle the response to the scanning of the individual achievement sticker. At 2230, the interactive incentivization application logic section 165 of the mobile device 135 can unlock reward content 150 in response to scanning the individual achievement sticker (e.g., 120, 125) in the patient passport 105, as also described above. The reward content 150 can be a storybook, a game, a character, a virtual world experience, and/or an augmented world experience, or the like.

At 2235, the remote server 1905 can cause one or more text messages 1915 to be automatically sent to the mobile device 1920 of the one or more parents 1910 and/or to the mobile device 135 of the pediatric patient 130. The one or more text messages 1915 can help the one or more parents 1910 to facilitate play with their child, the pediatric patient 130, and/or with the interactive companion toy 405, particularly at an in-home environment when there are fewer or no clinical trial personnel to provide assistance. In some embodiments, the one or more text messages 1915 can be automatically sent to the one or more parents 1910 the day before a site visit to help families alleviate anxiety through medical play with the interactive companion toy 405 prior to the actual site visit. The one or more text messages 1915 can include a reminder for an on-site appointment, instructions for the on-site appointment, and/or explanations for practice play with the interactive companion toy 405, or the like.

At 2240, electronic patient-reported outcomes can be incentivized using the interactive incentivization application logic section 165 and/or the interactive companion toy 405. The patient-reported outcome collection logic section 725 of the interactive incentivization application logic section 165 can collect survey data directly from the pediatric patient 130 and/or from the one or more parents 1910 as described above. Alternatively or in addition, the patient-reported outcome collection logic section 725 of the interactive incentivization application logic section 165 can interface with a third party survey collection service to collect the survey data. Upon completion of the one or more survey questions 605, the interactive incentivization application logic section 165 can cause reward content 150 to be unlocked and presented to the pediatric patient 130 through the touch-sensitive display screen 140 of the mobile device 135, as described in detail above.

At 2245, electronic patient-reported outcomes such as the one or more survey questions 605 can be collected and processed. In some embodiments, the pediatric patient 130 can be asked the one or more survey questions 605 via the touch-sensitive display screen 140 of the mobile device 135. In some embodiments, the pediatric patient 130 can be asked the one or more survey questions 605 via a pop-up message, through a virtual mailbox, and/or via other digital methods. In some embodiments, the interactive companion toy 405 itself can interface with one or more physical accessories 2015, as described above.

At 2250, insights about disease care and/or insights about the clinical trial can be provided via the cloud-based portal 1800. Using the cloud-based portal 1800, sponsors of the clinical trial can observe trends such as when the pediatric patients provide medical care to their interactive companion toys and how they perform the medical care. Such insights can help companies identify gaps in knowledge or opportunities for additional education if they see that the pediatric patients are repeatedly performing medical procedures incorrectly on their interactive companion toys.

Some embodiments include a system for aiding in a medical clinical trial involving one or more pediatric patients. The system can include a companion toy including a pattern disposed on a body of the companion toy. The system can include a patient passport including an incentivized clinical trial roadmap for the one or more pediatric patients, wherein the incentivized clinical trial roadmap includes one or more individual achievement sticker placeholders. The system can include one or more individual achievement stickers having an adhesive on one side thereof, wherein the patient passport is configured to receive the one or more individual achievement stickers at one or more locations corresponding to the one or more individual achievement sticker placeholders of the incentivized clinical trial roadmap. The system can include a mobile device including a touch-sensitive display screen, a camera, and an interactive incentivization application logic section, wherein the camera is configured to scan the pattern that is disposed on the body of the companion toy, and the interactive incentivization application logic section is configured to initiate virtual medical care associated with the clinical trial of the companion toy via the touch-sensitive display screen of the mobile device in response to the camera scanning the pattern disposed on the body of the companion toy. In some embodiments, a virtual clinical trial of the companion toy can substantially match and/or mimic the actual real-world clinical trial involving the one or more pediatric patients In some embodiments, the camera is configured to scan the one or more individual achievement stickers at the one or more locations of the patient passport, and the interactive incentivization application logic section is configured to display reward content for the one or more pediatric patients via the touch-sensitive display screen of the mobile device in response to the camera scanning the one or more individual achievement stickers at the one or more locations of the patient passport. In some embodiments, the incentivization application logic section includes a medical procedure simulation logic section operable within the mobile device. In some embodiments, the camera of the mobile device is configured to capture a series of live images of the companion toy having the pattern. In some embodiments, the mobile device is configured to display the series of live images on the touch-sensitive display screen of the mobile device. In some embodiments, the medical procedure simulation logic section is configured to cause the pattern within the series of live images to be scanned, and to initiate an interactive augmented reality experience to simulate a medical procedure responsive to the scanned pattern. In some embodiments, the medical procedure simulation logic section is configured to cause at least a portion of the body of the companion toy to be displayed on the touch-sensitive display screen. In some embodiments, the medical procedure simulation logic section is configured to cause one or more digital virtual medical tools to be displayed superimposed over the series of live images. In some embodiments, the medical procedure simulation logic section of the interactive medical procedure simulation logic section is configured to receive one or more indications from the one or more pediatric patients to manipulate the one or more digital virtual medical tools to administer the virtual medical care associated with the clinical trial to the companion toy.

In some embodiments, the medical procedure simulation logic section is configured to receive the one or more indications from the one or more pediatric patients via the touch-sensitive display screen to manipulate the one or more digital virtual medical tools to administer the virtual medical care associated with the clinical trial to the companion toy.

In some embodiments, the incentivization application logic section includes a protocol selector logic section that is configured to receive a unique ID. Based on the unique ID, the protocol selector logic section is configured to select one or more protocols matching the clinical trial involving the one or more pediatric patients. The selected one or more protocols indicate which type of virtual medical care is able to be administered to the companion toy corresponding to the clinical trial. In some embodiments, the medical procedure simulation logic section of the incentivization application logic section is configured to cause the touch-sensitive display screen of the mobile device to provide visual feedback to the one or more pediatric patients associated with the virtual medical care provided to the body of the companion toy.

In some embodiments, the reward content is a storybook. In some embodiments, the incentivization application logic section includes a storybook logic section. In some embodiments, the storybook logic section is configured to display the storybook on the touch-sensitive display screen of the mobile device in response to the camera scanning the one or more individual achievement stickers at the one or more locations of the patient passport.

In some embodiments, the reward content is an interactive character. In some embodiments, the incentivization application logic section includes an interactive character logic section. In some embodiments, the interactive character logic section is configured to display the interactive character on the touch-sensitive display screen of the mobile device in response to the camera scanning the one or more individual achievement stickers at the one or more locations of the patient passport.

In some embodiments, the reward content is an interactive world. In some embodiments, the incentivization application logic section includes an interactive world logic section. In some embodiments, the interactive world logic section is configured to display the interactive world on the touch-sensitive display screen of the mobile device in response to the camera scanning the one or more individual achievement stickers at the one or more locations of the patient passport.

In some embodiments, the interactive world is a side-scrolling world including one or more virtual buildings and one or more virtual items. In some embodiments, the one or more virtual items are configured to become interactable in response to the one or more pediatric patients completing a task. In some embodiments, the reward content is a virtual hospital. In some embodiments, the incentivization application logic section includes an interactive experience logic section. In some embodiments, the interactive experience logic section is configured to display the virtual hospital on the touch-sensitive display screen of the mobile device in response to the camera scanning the one or more individual achievement stickers at the one or more locations of the patient passport.

In some embodiments, the reward content is a music maker. In some embodiments, the incentivization application logic section includes an interactive game logic section. In some embodiments, the interactive game logic section is configured to display the music maker on the touch-sensitive display screen of the mobile device in response to the camera scanning the one or more individual achievement stickers at the one or more locations of the patient passport.

In some embodiments, the reward content is an interactive kitchen. In some embodiments, the incentivization application logic section includes an interactive experience logic section. In some embodiments, the interactive experience logic section is configured to display the interactive kitchen on the touch-sensitive display screen of the mobile device in response to the camera scanning the one or more individual achievement stickers at the one or more locations of the patient passport.

In some embodiments, the reward content is a character unlock sequence. In some embodiments, the incentivization application logic section includes an interactive unlock sequence logic section. In some embodiments, the interactive unlock sequence logic section is configured to display the character unlock sequence on the touch-sensitive display screen of the mobile device in response to the camera scanning the one or more individual achievement stickers at the one or more locations of the patient passport. In some embodiments, the interactive unlock sequence includes two or more phases of a character. In some embodiments, each of the phases of the character are evolved in response to the camera scanning different individual achievement stickers from among the one or more individual achievement stickers.

The system can include a remote server, wherein the remote server is configured to automatically send one or more text messages to the incentivization application logic section of the mobile device including at least one of i) a reminder of an on-site appointment associated with the clinical trial, ii) a reminder to practice medical play associated with the clinical trial with the companion toy, or iii) instructions on how to practice the medical play associated with the clinical trial with the companion toy. In some embodiments, the incentivization application logic section of the mobile device is configured to display one or more survey questions on the touch-sensitive display screen of the mobile device for the one or more pediatric patients to complete. In some embodiments, the incentivization application logic section of the mobile device is configured to receive one or more responses to the one or more survey questions via the touch-sensitive display screen of the mobile device. In some embodiments, the incentivization application logic section is configured to cause to be sent the one or more responses to the remote server. In some embodiments, the remote server is configured to process the one or more survey questions and to generate summary information regarding the clinical trial.

The system can include a cloud-based portal communicatively coupled to the remote server, wherein the cloud-based portal is configured to provide one or more insights about the clinical trial. In some embodiments, the one or more insights includes visualization of data collected from use of the interactive companion toy by the one or more pediatric patients.

The system can include one or more Likert pain scale cards, wherein the interactive companion toy includes a sensor that is configured to detect which of the one or more Likert pain scale cards comes into at least one of i) contact or ii) close contact to the interactive companion toy. In some embodiments, the interactive companion toy is configured to store information regarding which of the one or more Likert pain scale cards comes into the at least one of the i) contact or the ii) close contact to the interactive companion toy, and wherein the interactive companion toy is configured to transmit the information to the remote server. In some embodiments, wherein the incentivization application logic section of the mobile device is configured to obtain at least one of i) assent or ii) consent to participate in the clinical trial from at least one of i) the one or more pediatric patients or ii) one or more parents of the one or more pediatric patients.

Embodiments are described herein, and illustrated in the drawings, in terms of functional blocks, units and/or modules. Those skilled in the art will appreciate that these blocks, units and/or modules can be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

The following discussion is intended to provide a brief, general description of a suitable machine or machines in which certain aspects of the inventive concept can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc. The machine can include logic sections. The logic sections can comprise hardware, firmware, software, or any combination thereof.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the invention may include a non-transitory machine-readable medium comprising instructions executable by one or more processors, the instructions comprising instructions to perform the elements of the embodiments as described herein.

Consequently, in view of the wide variety of permutations to the embodiments described herein, this detailed description and accompanying material is intended to be illustrative only, and should not be taken as limiting the scope of the inventive concept. What is claimed as the invention, therefore, is all such modifications as may come within the scope and spirit of the following claims and equivalents thereto.

The invention claimed is:

1. A system for aiding in a medical clinical trial involving one or more pediatric patients, the system comprising:
   a companion toy including a pattern disposed on a body of the companion toy;
   a patient passport including an incentivized clinical trial roadmap for the one or more pediatric patients, wherein the incentivized clinical trial roadmap includes one or more individual achievement sticker placeholders;
   one or more individual achievement stickers having an adhesive on one side thereof, wherein the patient passport is configured to receive the one or more individual achievement stickers at one or more locations corresponding to the one or more individual achievement sticker placeholders of the incentivized clinical trial roadmap; and
   a mobile device including a touch-sensitive display screen, a camera, and an interactive incentivization application logic section, wherein the camera is configured to scan the pattern that is disposed on the body of the companion toy, and the interactive incentivization application logic section is configured to initiate virtual medical care associated with a clinical trial of the companion toy via the touch-sensitive display screen of the mobile device in response to the camera scanning the pattern disposed on the body of the companion toy, and wherein the clinical trial of the companion toy substantially matches the clinical trial involving the one or more pediatric patients,
   wherein:
   the camera is configured to scan the one or more individual achievement stickers at the one or more locations of the patient passport, and the interactive incentivization application logic section is configured to display reward content for the one or more pediatric patients via the touch-sensitive display screen of the mobile device in response to the camera scanning the one or more individual achievement stickers at the one or more locations of the patient passport;
   the incentivization application logic section includes a medical procedure simulation logic section operable within the mobile device;
   the camera of the mobile device is configured to capture a series of live images of the companion toy having the pattern;
   the mobile device is configured to display the series of live images on the touch-sensitive display screen of the mobile device;
   the medical procedure simulation logic section is configured to cause the pattern within the series of live images to be scanned, and to initiate an interactive augmented reality experience to simulate a medical procedure responsive to the scanned pattern;
   the medical procedure simulation logic section is configured to cause at least a portion of the body of the companion toy to be displayed on the touch-sensitive display screen;
   the medical procedure simulation logic section is configured to cause one or more digital virtual medical tools to be displayed superimposed over the series of live images; and
   the medical procedure simulation logic section of the interactive medical procedure simulation logic section is configured to receive one or more indications from the one or more pediatric patients to manipulate the one or more digital virtual medical tools to administer the virtual medical care associated with the clinical trial to the companion toy.

2. The system of claim 1, wherein the medical procedure simulation logic section is configured to receive the one or more indications from the one or more pediatric patients via the touch-sensitive display screen to manipulate the one or more digital virtual medical tools to administer the virtual medical care associated with the clinical trial to the companion toy.

3. The system of claim 2, wherein:
   the incentivization application logic section includes a protocol selector logic section that is configured to receive a unique identifier (ID);
   based on the unique ID, the protocol selector logic section is configured to select one or more protocols matching the clinical trial involving the one or more pediatric patients;
   the selected one or more protocols indicate which type of virtual medical care is able to be administered to the companion toy corresponding to the clinical trial; and
   the medical procedure simulation logic section of the incentivization application logic section is configured to cause the touch-sensitive display screen of the mobile device to provide visual feedback to the one or more pediatric patients associated with the virtual medical care provided to the body of the companion toy.

4. The system of claim 1, wherein:
   the reward content is a storybook;
   the incentivization application logic section includes a storybook logic section; and
   the storybook logic section is configured to display the storybook on the touch-sensitive display screen of the mobile device in response to the camera scanning the one or more individual achievement stickers at the one or more locations of the patient passport.

5. The system of claim 1, wherein:
the reward content is an interactive character;
the incentivization application logic section includes an interactive character logic section; and
the interactive character logic section is configured to display the interactive character on the touch-sensitive display screen of the mobile device in response to the camera scanning the one or more individual achievement stickers at the one or more locations of the patient passport.

6. The system of claim 1, wherein:
the reward content is an interactive world;
the incentivization application logic section includes an interactive world logic section; and
the interactive world logic section is configured to display the interactive world on the touch-sensitive display screen of the mobile device in response to the camera scanning the one or more individual achievement stickers at the one or more locations of the patient passport.

7. The system of claim 6, wherein:
the interactive world is a side-scrolling world including one or more virtual buildings and one or more virtual items; and
the one or more virtual items are configured to become interactable in response to the one or more pediatric patients completing a task.

8. The system of claim 1, wherein:
the reward content is a virtual hospital;
the incentivization application logic section includes an interactive experience logic section; and
the interactive experience logic section is configured to display the virtual hospital on the touch-sensitive display screen of the mobile device in response to the camera scanning the one or more individual achievement stickers at the one or more locations of the patient passport.

9. The system of claim 1, wherein:
the reward content is a music maker;
the incentivization application logic section includes an interactive game logic section; and
the interactive game logic section is configured to display the music maker on the touch-sensitive display screen of the mobile device in response to the camera scanning the one or more individual achievement stickers at the one or more locations of the patient passport.

10. The system of claim 1, wherein:
the reward content is an interactive kitchen;
the incentivization application logic section includes an interactive experience logic section; and
the interactive experience logic section is configured to display the interactive kitchen on the touch-sensitive display screen of the mobile device in response to the camera scanning the one or more individual achievement stickers at the one or more locations of the patient passport.

11. The system of claim 1, wherein:
the reward content is a character unlock sequence;
the incentivization application logic section includes an interactive unlock sequence logic section;
the interactive unlock sequence logic section is configured to display the character unlock sequence on the touch-sensitive display screen of the mobile device in response to the camera scanning the one or more individual achievement stickers at the one or more locations of the patient passport;
the interactive unlock sequence includes two or more phases of a character; and
each of the phases of the character are evolved in response to the camera scanning different individual achievement stickers from among the one or more individual achievement stickers.

12. The system of claim 1, further comprising a remote server, wherein the remote server is configured to automatically send one or more text messages to the incentivization application logic section of the mobile device including at least one of i) a reminder of an on-site appointment associated with the clinical trial, ii) a reminder to practice medical play associated with the clinical trial with the companion toy, or iii) instructions on how to practice the medical play associated with the clinical trial with the companion toy.

13. The system of claim 12, wherein:
the incentivization application logic section of the mobile device is configured to display one or more survey questions on the touch-sensitive display screen of the mobile device for the one or more pediatric patients to complete;
the incentivization application logic section of the mobile device is configured to receive one or more responses to the one or more survey questions via the touch-sensitive display screen of the mobile device; and
the incentivization application logic section is configured to cause to be sent the one or more responses to the remote server.

14. The system of claim 13, wherein the remote server is configured to process the one or more survey questions and to generate summary information regarding the clinical trial.

15. The system of claim 14, further comprising a cloud-based portal communicatively coupled to the remote server, wherein the cloud-based portal is configured to provide one or more insights about the clinical trial.

16. The system of claim 15, wherein the one or more insights includes visualization of data collected from use of the interactive companion toy by the one or more pediatric patients.

17. The system of claim 12, further comprising one or more Likert pain scale cards, wherein the interactive companion toy includes a sensor that is configured to detect which of the one or more Likert pain scale cards comes into at least one of i) contact or ii) close contact to the interactive companion toy.

18. The system of claim 17, wherein the interactive companion toy is configured to store information regarding which of the one or more Likert pain scale cards comes into the at least one of the i) contact or the ii) close contact to the interactive companion toy, and wherein the interactive companion toy is configured to transmit the information to the remote server.

19. The system of claim 1, wherein the incentivization application logic section of the mobile device is configured to obtain at least one of i) assent or ii) consent to participate in the clinical trial from at least one of i) the one or more pediatric patients or ii) one or more parents of the one or more pediatric patients.

* * * * *